US011631282B2

(12) United States Patent
Tabata et al.

(10) Patent No.: US 11,631,282 B2
(45) Date of Patent: Apr. 18, 2023

(54) APPARATUS FOR ESTIMATING REMAINING LIFE OF VEHICLE COMPONENT

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Masafumi Yamamoto, Nagakute (JP); Yoshito Sekiguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 17/036,593

(22) Filed: Sep. 29, 2020

(65) Prior Publication Data

US 2021/0125420 A1  Apr. 29, 2021

(30) Foreign Application Priority Data

Oct. 25, 2019  (JP) .............................. JP2019-194185

(51) Int. Cl.
*G07C 5/00* (2006.01)
*G07C 5/02* (2006.01)

(52) U.S. Cl.
CPC .............. *G07C 5/006* (2013.01); *G07C 5/02* (2013.01)

(58) Field of Classification Search
CPC .................. G07C 5/006; G07C 5/02
See application file for complete search history.

(56) References Cited

U.S. PATENT DOCUMENTS

| 5,608,845 | A | 3/1997 | Ohtsuka et al. |
| 6,732,031 | B1 * | 5/2004 | Lightner ................ G06Q 50/30 |
| | | | 701/34.3 |
| 2008/0147265 | A1 * | 6/2008 | Breed .................. G07C 5/0808 |
| | | | 701/424 |
| 2010/0174576 | A1 * | 7/2010 | Naylor .................. G06Q 10/04 |
| | | | 706/54 |

FOREIGN PATENT DOCUMENTS

| JP | H01-197146 A | 8/1989 |
| JP | H03-15768 A | 1/1991 |
| JP | 2002-183337 A | 6/2002 |
| JP | 2013-88208 A | 5/2013 |
| JP | 2013-231673 A | 11/2013 |
| JP | 2018-135977 A | 8/2018 |

* cited by examiner

*Primary Examiner* — Gertrude Arthur Jeanglaude
(74) *Attorney, Agent, or Firm* — Oliff PLC

(57) ABSTRACT

An apparatus for estimating a remaining life of a vehicle component included in a vehicle, based on various kinds of remaining-life-related data that influence the remaining life. The apparatus includes: a data transmitting portion provided in the vehicle, and configured to correlate the remaining-life-related data with running of the vehicle and to transmit the remaining-life-related data correlated with the running of the vehicle, to a data management center provided outside the vehicle, via a wireless communication; a data-unobtained running-section specifying portion configured to specify a data-unobtained running section in which the remaining-life-related data has been unobtainable by the data management center; and a remaining-life calculating portion configured to estimate the remaining life, by taking account of a reduction of the remaining life of the vehicle component in the data-unobtained running section.

8 Claims, 10 Drawing Sheets

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

APPARATUS FOR ESTIMATING REMAINING LIFE OF VEHICLE COMPONENT

This application claims priority from Japanese Patent Application No. 2019-194185 filed on Oct. 25, 2019, the disclosure of which is herein incorporated by reference in its entirety.

FIELD OF THE INVENTION

The present invention relates to a remaining-life estimation apparatus for estimating a remaining life of a vehicle component, and particularly to an improvement in such a remaining-life estimation apparatus in which remaining-life-related data of a vehicle is transmitted to a data management center via a wireless communication.

BACKGROUND OF THE INVENTION

There is proposed a remaining-life estimation apparatus for estimating a remaining life of a vehicle component to which a load is applied during running of a vehicle, based on various kinds of remaining-life-related data that influence the remaining life. JP2018-135977A discloses an example of such an apparatus. In the apparatus disclosed in this Japanese Patent Application Publication, (i) a damage degree of a clutch is obtained based on remaining-life-related data that are data upon start of a vehicle such as a slip amount of the clutch, an acceleration of the vehicle and a temperature of the clutch that has a correlation with an oil temperature, (ii) an amount of wear of the clutch is estimated based the damage degree of the clutch, and (iii) a remaining life of the clutch is estimated, by obtaining a correlation (approximation straight line) between the amount of wear of the clutch and a running time/distance of the vehicle. Further, JP2002-183337A as another Japanese Patent Application Publication discloses a technique of estimating a remaining life of a component of a vehicle, based on remaining-life-related data such as a running distance of the vehicle, which are obtained via a wireless communication such as an internet, and informs an user of the vehicle of, for example, a time to replace the component.

SUMMARY OF THE INVENTION

However, where the remaining-life-related data are obtained via the wireless communication, if the communication is temporarily interrupted due to a communication environment such as running in a tunnel, the data could be at least partially missing whereby an accuracy of estimating the remaining life could be reduced.

The present invention was made in view of the background art described above. It is therefore an object of the present invention to improve an accuracy of estimation of a remaining life, which is made based on remaining-life-related data obtained via a wireless communication.

The object indicated above is achieved according to the following aspects of the present invention.

According to a first aspect of the invention, there is provided an apparatus for estimating a remaining life of a vehicle component included in a vehicle, based on various kinds of remaining-life-related data that influence the remaining life, the apparatus comprising: a data transmitting portion provided in the vehicle, and configured to correlate the remaining-life-related data with running of the vehicle and to transmit the remaining-life-related data correlated with the running of the vehicle, to a data management center provided outside the vehicle, via a wireless communication; a data-unobtained running-section specifying portion configured to specify a data-unobtained running section in which the remaining-life-related data has been unobtainable by the data management center; and a remaining-life calculating portion configured to estimate the remaining life, by taking account of a reduction of the remaining life of the vehicle component in the data-unobtained running section.

According to a second aspect of the invention, in the control apparatus according to the first aspect of the invention, the remaining-life calculating portion is configured to reduce the remaining life, depending on a ratio of a total running section of the vehicle to a data-obtained running section in which the remaining-life-related data has been obtained by the data management center, the total running section consisting of the data-obtained running section and the data-unobtained running section.

According to a third aspect of the invention, in the control apparatus according to the second aspect of the invention, the total running section of the vehicle is one of a total running distance and a total running time of the vehicle, wherein the data-obtained running section is one of a running distance and a running time for which the remaining-life-related data has been obtained by the data management center.

According to a fourth aspect of the invention, in the control apparatus according to any one of the first through third aspects of the invention, the remaining-life calculating portion includes: a data complementing portion configured to complement the remaining-life-related data, based on the data-unobtained running section; and a life calculating portion configured to calculate the remaining life, based on complemented data that are the remaining-life-related data complemented by the data complementing portion.

According to a fifth aspect of the invention, in the control apparatus according to any one of the first through fourth aspects of the invention, the remaining-life calculating portion is configured to obtain a load distribution that represents a relationship between a magnitude and a frequency of a load applied to the vehicle component, based on the remaining-life-related data, and to compare the obtained load distribution with strength information that is predefined as a load distribution representing a given limit of endurance of the vehicle component, so as to calculate a cumulative fatigue-damage degree, wherein the remaining-life calculating portion is configured to estimate the remaining life, based on the calculated cumulative fatigue-damage degree.

According to a sixth aspect of the invention, in the control apparatus according to any one of the first through fifth aspects of the invention, the data transmitting portion is configured to transmit, to the data management center, the remaining-life-related data and running-related information that includes at least one of a cumulative running distance and a cumulative running time of the vehicle, wherein the data-unobtained running-section specifying portion is configured to determine, as the data-unobtained running section, a section in which the at least one of the cumulative running distance and the cumulative running time has been changed discontinuously.

According to a seventh aspect of the invention, in the control apparatus according to any one of the first through sixth aspects of the invention, the vehicle component is a drive-force transmitting device including a plurality of component elements having respective durabilities that are different from each other, wherein the remaining-life calculating portion is configured to estimate remaining lives of the respective component elements, and to determine, as the remaining life of the drive-force transmitting device, a shortest one of the estimated remaining lives of one of the component elements among the estimated remaining lives of the respective component elements.

According to an eighth aspect of the invention, in the control apparatus according to any one of the first through seventh aspects of the invention, the data-unobtained running-section specifying portion and the remaining-life calculating portion are provided in a server of the data management center, wherein the server includes a life-information transmitting portion configured to transmit information related to the remaining life, to the vehicle, and wherein the apparatus comprises a remaining-life transmission portion provided in the vehicle and configured to transmit the information related to the remaining life, to an outside of the vehicle.

In the apparatus according to the invention, the remaining-life-related data correlated with the running of the vehicle are transmitted to the data management center via a wireless communication; so that the data-unobtained running section (in which the remaining-life-related data could not been obtained by the data management center) can be specified based on, for example, presence/absence of the remaining-life-related data. It is therefore possible to estimate the remaining life by taking account of reduction of the remaining life of the vehicle component in the data-unobtained running section, thereby improving an accuracy of estimation of the remaining life.

In the apparatus according to the second aspect of the invention, the remaining life is calculated to be reduced depending on the ratio of the total running section of the vehicle to the data-obtained running section of the vehicle, wherein the total running section consists of the data-obtained running section and the data-unobtained running section. It is therefore possible to estimate the remaining life with a high accuracy in spite of missing of the remaining-life-related data in the data-unobtained running section.

In the apparatus according to the third aspect of the invention, the total running section of the vehicle is the total running distance or the total running time of the vehicle, and the data-obtained running section is the running distance or time in which the remaining-life-related data has been obtained by the data management center. Thus, the remaining life can be estimated with a high accuracy, by reducing the remaining life depending on the running distance or time in which the remaining-life-related data has been obtained by the data management center.

In the apparatus according to the fourth aspect of the invention, the remaining-life-related data is complemented based on the data-unobtained running section, and the remaining life is calculated based on the complemented data that are the remaining-life-related data complemented by the data complementing portion, whereby the remaining life can be estimated with a high accuracy.

In the apparatus according to the fifth aspect of the invention, the load distribution, which is the relationship between the magnitude and the frequency of the load applied to the vehicle component, is obtained based on the remaining-life-related data, and the cumulative fatigue-damage degree is calculated by comparing the obtained load distribution with the predefined strength information. The remaining life is estimated based on the calculated cumulative fatigue-damage degree, whereby the remaining life can be estimated with a high accuracy.

In the apparatus according to the sixth aspect of the invention, the running-related information that includes at least one of the cumulative running distance and the cumulative running time of the vehicle is transmitted to the data management center, and the section in which the at least one of the cumulative running distance and the cumulative running time has been changed discontinuously is determined as the data-unobtained running section, whereby the data-unobtained running section can be easily specified with a high accuracy.

In the apparatus according to the seventh aspect of the invention, the remaining life of the drive-force transmitting device, which includes the plurality of component elements having the respective different durabilities, is estimated, such that the remaining lives of the respective component elements are estimated, and the shortest one of the estimated remaining lives of one of the component elements is regarded as the remaining life of the drive-force transmitting device. It is therefore possible to appropriately evaluate the remaining life of the drive-force transmitting device including the plurality of component elements having the respective different durabilities.

In the apparatus according to the eighth aspect of the invention, the data-unobtained running-section specifying portion and the remaining-life calculating portion are provided in the server of the data management center that is provided outside the vehicle, and the information related to the remaining life is transmitted to the vehicle so that the information related to the remaining life is sent to, for example, a maintenance shop engineer or a user of the vehicle. Thus, those who received the information related to the remaining life can easily understand the remaining life of the vehicle component and appropriately replace the vehicle component as needed.

DETAILED DESCRIPTION OF PREFERRED EMBODIMENT

Figure 1:
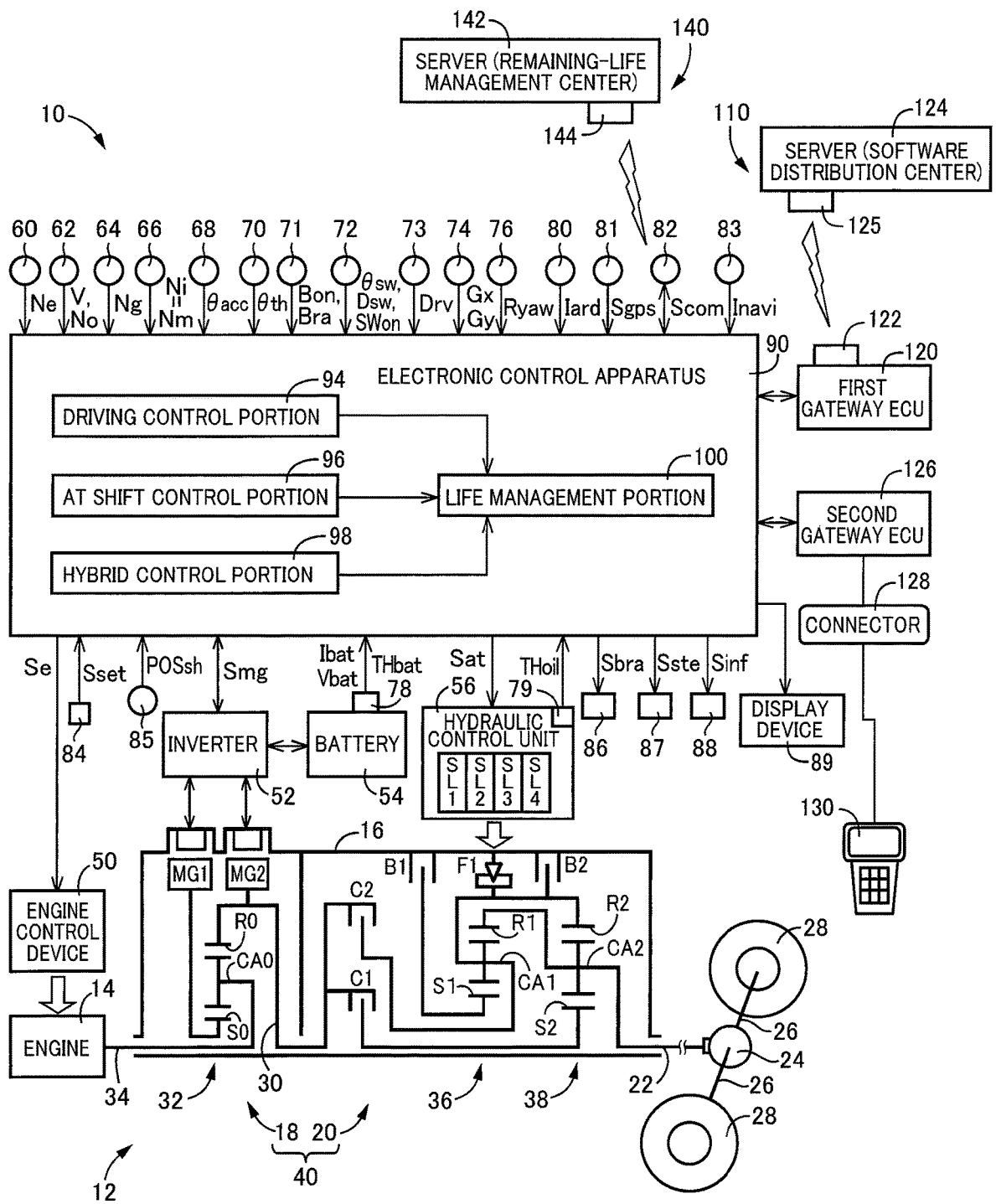
FIG. 1 is a view for explaining a vehicle together with a remaining-life estimation apparatus to which the present invention is applied, and also major portions of control functions and control systems that are provided to perform various control operations for the vehicle.

The remaining-life estimation apparatus according to the present invention is advantageously applied to, for example, a case in which a remaining life of an automatic transmission is to be estimated. However, the apparatus according to the present invention can be applied to also a case in which a remaining life of any one of various kinds of vehicle components such as other drive-force transmitting devices, an engine, a damper device, a clutch for connecting/disconnecting transmission of a drive force from a drive force source, a differential device, gears provided in various portions, various kinds of bearings, a suspension device and a cushion device. Where the vehicle component includes a plurality of component elements as in the case of the automatic transmission, it is possible to estimate the remaining life of each of the component elements as the vehicle component. The apparatus according to the present invention is applicable to any kinds of vehicles such as an electric vehicle, a hybrid vehicle and an engine-drive vehicle, as long as the vehicle is caused to run by a drive force source such as an engine and an electric motor, and includes a vehicle component whose remaining life is to be estimated. Further, the vehicle may be a vehicle that does not include a transmission.

The automatic transmission includes a plurality of component elements such as a clutch, a brake, an oil pump and a bearing, to each of which a load is to be applied, and remaining lives of the respective component elements are different from each other. Where the vehicle component includes a plurality of component elements as in the case of the automatic transmission, it is preferable to estimate remaining lives of the respective the component elements, and to determine, as the remaining life of the vehicle component (such as the automatic transmission) as a whole, a shortest one of the estimated remaining lives of one of the component elements among the estimated remaining lives of the respective component elements. However, it is not always necessary to estimate the remaining lives of all of the component elements. For example, it is possible to estimate the remaining life or lives of a selected one or ones of the components, which are expected to be shorter than those of the other components through experimentation or simulation. Further, it is possible to employ any of various arrangements such as an arrangement in which the remaining life of a predetermined one of the component elements is obtained and the obtained remaining life of the predetermined component element is determined as the remaining life of the vehicle component as a whole.

The data-unobtained running-section specifying portion is configured to determine, as the data-unobtained running section, for example, a running section in which the cumulative running distance or cumulative running time of the vehicle has been changed discontinuously, namely, data of the cumulative running distance or cumulative running time have been interrupted. However, it is also make the determination, by using other cumulative amount such as a cumulative number of rotations, which is cumulatively changed even in the data-unobtained running section. Further, the data-unobtained running section can be specified by any of various arrangements such as an arrangement in which information of location of the vehicle is obtained as the running-related information and a running section in which the information of the location has been changed discontinuously is determined as the data-unobtained running section. In this arrangement, a distance of the data-unobtained running section can be obtained based on the discontinuous change of the information of the location, and the remaining life can be modified or corrected, for example, depending on a ratio of the total running distance to a distance of the data-obtained running section, which also can be obtained based on the information of the location. The running-related information such as the cumulative running distance and cumulative running time can be used also as the remaining-life-related data.

The remaining-life calculating portion is configured to reduce (decrease) the remaining life, for example, depending on the ratio of the total running section to the data-obtained running section, wherein the total running section consists of the data-obtained running section and the data-unobtained running section. However, since the remaining life is not necessarily reduced at a constant rate throughout the total running section, the remaining life may be reduced in a suitable manner depending on, for example, a characteristic of reduction of the remaining life of the vehicle component. For example, the remaining life may be reduced based on the remaining-life-related data in a certain section before the data-unobtained running section and the remaining-life-related data in another certain section after the data-unobtained running section. Further, the remaining-life calculating portion includes, for example, the data complementing portion configured to complement the remaining-life-related data, based on the data-unobtained running section; and the life calculating portion configured to calculate the remaining life, based on the complemented data that are the remaining-life-related data complemented by the data complementing portion. However, it is also possible to employ any one of various arrangements such as an arrangement in which the remaining life is calculated based on the remaining-life-related data actually transmitted from the vehicle and then the remaining life is modified or corrected depending on, for example, the ratio of the total running section to the data-obtained running section.

It is preferable that the remaining-life calculating portion is configured to obtain the load distribution that represents the relationship between the magnitude and the frequency (such as a total number of instances, a total length of time and a total number of rotations) of the load (such as a torque and a rotational speed) applied to the vehicle component, for example, based on the remaining-life-related data, and to compare the obtained load distribution with the strength information (such as fatigue limit or endurance limit) that is predefined as the load distribution representing a given limit of endurance of the vehicle component, so as to calculate the cumulative fatigue-damage degree, such that the remaining life is estimated based on the cumulative fatigue-damage degree, by the remaining-life calculating portion. The cumulative fatigue-damage degree is a value obtained by integrating fatigue damage degrees in all regions or levels of the load, and is calculated, for example, in accordance with Miner's law or modified Miner's law. For the estimation of the remaining life, the load distribution does not necessarily have to be used, and the estimation of the remaining life may be made in any one of various manners, depending on, for example, a damage factor of the vehicle component whose remaining life is to be estimated. For example, the remaining life may be estimated based on a predefined life characteristic, by using only the running distance or time, without using the load distribution. Also in a case in which the remaining life of the drive-force transmitting device such as an automatic transmission is to be estimated, the estimation of the remaining life can be made by using only the running distance or time, such that only the cumulative running distance or cumulative running time is transmitted as the remaining-life-related data to the data management center. Moreover, the estimation of the remaining life can be made by using techniques disclosed in the above-identified Japanese Patent Application Publications (JP2018-135977A and JP2002-183337A).

The remaining-life-related data are information required by the remaining-life calculating portion to estimate the remaining life, for example, are information required to obtain the load applied to the vehicle component. In a case in which the remaining life of the automatic transmission is to be estimated, the remaining life is influenced largely by an input torque as the load applied to the automatic transmission, so that the remaining-life-related data need include, for example, a drive-force source torque (including a negative toque such as an engine braking torque) of the vehicle. Where an electrically-controlled continuously-variable transmission portion is provided on an input side of the automatic transmission, a regenerative torque generated by a rotating machine of the electrically-controlled continuously-variable transmission portion also constitutes the load applied to the automatic transmission and influences the remaining life of the automatic transmission. Further, it is preferable that the remaining-life-related data include information related to a temperature of a lubricant fluid in the automatic transmission, an average acceleration of the vehicle, a resonance running distance of the vehicle, which influence the remaining life of each component element of the automatic transmission. Still further, it is preferable that the remaining-life-related data include maintenance information such as presence or absence of change of the lubricant fluid, since the change of the lubricant fluid influences the remaining life of the component elements such as bearings and gears that are lubricated by the lubricant fluid. When the vehicle component such as the automatic transmission is replaced with a new one, the remaining-life-related data needs to be newly obtained, so that it is preferable, for example, to provide each vehicle component with its identification information and to manage the remaining-life-related data of each vehicle component independently by the identification information, so as to calculate the remaining life of each vehicle component.

In the remaining-life estimation apparatus, for example, the data-unobtained running-section specifying portion and the remaining-life calculating portion are provided in the server of the data management center. However, the data-unobtained running-section specifying portion and the remaining-life calculating portion may be provided, for example, in a control apparatus of the vehicle or a terminal of a vehicle dealer (vehicle sales company), so that certain operations are executed by receiving required data such as the remaining-life-related data from the data management center. The data management center is configured to receive, from the vehicle, the remaining-life-related data and the running-related information, through a wireless communication using, for example, a mobile phone network, a wireless LAN network and internet, and to manage the received data and information. The data management center is installed by, for example, a manufacturer of the vehicle, and may be provided in the vehicle dealer.

Embodiment

Hereinafter, preferred embodiment of the invention will be described in detail with reference to the accompanying drawings.

FIG. 1 is a view for explaining a construction of a drive-force transmitting device 12 of a vehicle 10, and also major portions of control functions and control systems that are provided to perform various control operations for the vehicle 10, wherein the drive-force transmitting device 12 whose remaining life is to be estimated by a remaining-life estimation apparatus (that may be referred also to as "remaining-life estimation system") 140 as an embodiment of the present invention. As shown in FIG. 1, the vehicle 10 includes an engine 14 and first and second rotating machines MG1, MG2. The drive-force transmitting device 12 includes a non-rotary member in the form of a transmission casing 16 that is attached to a body of the vehicle 10, an electrically-operated continuously-variable transmission portion 18 and a mechanically-operated step-variable transmission portion 20. The continuously-variable transmission portion 18 and the step-variable transmission portion 20 are provided within the casing 16, and are arranged in a series on a common axis. The continuously-variable transmission portion 18 is connected to the engine 14 directly or indirectly through, for example, a damper (not shown). The step-variable transmission portion 20 is connected to an output rotary member of the continuously-variable transmission portion 18. The drive-force transmitting device 12 further includes a differential gear device 24 connected to an output shaft 22 that is an output rotary member of the step-variable transmission portion 20, and a pair of axles 26 connected to the differential gear device 24. In the drive-force transmitting device 12, a drive force outputted from the engine 14 or the second rotating machine MG2 is transmitted to the step-variable transmission portion 20, and is then transmitted from the step-variable transmission portion 20 through the differential gear device 24 to drive wheels 28 of the vehicle 10, for example. The drive force is synonymous with a drive torque or a drive power unless otherwise distinguished from them. It is noted that the drive-force transmitting device 12 including the continuously-variable transmission portion 18 and the step-variable transmission portion 20 is constructed substantially symmetrically about its axis corresponding to the above-described common axis, so that a lower half of the drive-force transmitting device 12 is not shown in FIG. 1. The above-described common axis corresponds to axes of a crank shaft of the engine 14 and a connecting shaft 34 that is described below.

The engine 14 is a known internal combustion engine such as gasoline engine and diesel engine, which serves as a drive force source capable of generating a drive torque. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 14, is controlled. In the present embodiment, the engine 14 is connected to the continuously-variable transmission portion 18, without a fluid transmitting device (such as a torque converter and a fluid coupling device) disposed therebetween.

Each of the first and second rotating machines MG1, MG2 is a rotating electric machine having a function serving as an electric motor and a function serving as a generator. That is, each of the first and second rotating machines MG1, MG2 is a so-called "motor generator". The first and second rotating machines MG1, MG2 are connected to an electric storage device in the form of a battery 54 provided in the vehicle 10, through an inverter 52 provided in the vehicle 10. The inverter 52 is controlled by the electronic control apparatus 90 whereby an MG1 torque Tg and an MG2 torque Tm as output torques of the respective first and second rotating machines MG1, MG2 are controlled. The output torque of each of the first and second rotating machines MG1, MG2 serves as a power running torque when acting as a positive torque for acceleration, and serves as a regenerative torque when acting as a negative torque for deceleration. The battery 54 is the electric storage device to and from which an electric power is supplied from and to the first rotating machine MG1 and the second rotating machine MG2.

The continuously-variable transmission portion 18 is provided with: the above-described first rotating machine (first motor/generator) MG1; a differential mechanism 32 serving as a drive-force distributing device to mechanically distribute the drive force of the engine 14 to the first rotating machine MG1 and to an intermediate transmitting member 30 that is an output rotary member of the continuously-variable transmission portion 18; and a second rotating machine (second motor/generator) MG2 connected to the intermediate transmitting member 30 in a drive-force transmittable manner. The continuously-variable transmission portion 18 is an electrically-controlled continuously-variable transmission wherein a differential state of the differential mechanism 32 is controllable by controlling an operation state of the first rotating machine MG1. The first rotating machine MG1 serves as a differential rotating machine capable of controlling an engine rotational speed Ne that is a rotational speed of the engine 14. The second rotating machine MG2 serves as a vehicle-driving rotating machine, i.e., a drive force source capable of generating a drive torque driving the vehicle 10. The vehicle 10 is a hybrid vehicle provided with the drive force sources in the form of the engine 14 and the second rotating machine MG2. The drive force of each of the drive forces is to be transmitted to the drive wheels 28 through the drive-force transmitting device 12.

The differential mechanism 32 is a planetary gear device of a single-pinion type having a sun gear S0, a carrier CA0 and a ring gear R0. The carrier CA0 is connected to the engine 14 through the connecting shaft 34 in a drive-force transmittable manner, and the sun gear S0 is connected to the first rotating machine MG1 in a drive-force transmittable manner, while the ring gear R0 is connected to the intermediate transmitting member 30 and the second rotating machine MG2 in a drive-force transmittable manner. In the differential mechanism 32, the carrier CA0 serves as an input rotary element, and the sun gear S0 serves as a reaction rotary element, while the ring gear R0 serves as an output rotary element.

The step-variable transmission portion 20 is a mechanically-operated transmission mechanism which constitutes a part of a drive-force transmitting path between the intermediate transmitting member 30 and the drive wheels 28, namely, constitutes a part of a drive-force transmitting path between the continuously-variable transmission portion 18 and the drive wheels 28. The intermediate transmitting member 30 also serves as an input rotary member of the step-variable transmission portion 20. The step-variable transmission portion 20 is considered to also as a vehicle transmission constituting a part of a drive-force transmitting path between the drive force source (second rotating machine MG2 or engine 14) and the drive wheels 28, since the second rotating machine MG2 is connected to the intermediate transmitting member 30 such that the intermediate transmitting member 30 is rotated together with the second rotating machine MG2, or since the engine 14 is connected to an input rotary member of the continuously-variable transmission portion 18. The intermediate transmitting member 30 is a transmitting member through which the drive force of the drive force source is to be transmitted to the drive wheels 28. The step-variable transmission portion 20 is a known automatic transmission of a planetary gear type which is provided with a plurality of planetary gear devices in the form of a first planetary gear device 36 and a second planetary gear device 38, a one-way clutch F1, and a plurality of engagement devices including a clutch C1, a clutch C2, a brake B1 and a brake B2. Hereinafter, the clutch C1, clutch C2, brake B1 and brake B2 will be referred to as engagement devices CB unless otherwise specified.

Each of the engagement devices CB is a hydraulically-operated frictional engagement device in the form of a multiple-disc type or a single-disc type clutch or brake that is to be pressed by a hydraulic actuator, or a band brake that is to be tightened by a hydraulic actuator. The engagement devices CB are selectively placed in engaged, slipped or released states as the operation states, with engaging torques Tcb as torque capacities being changed by engaging hydraulic pressures Pcb as regulated pressures supplied from linear solenoid valves SL1-SL4 of a hydraulic control unit (hydraulic control circuit) 56 provided in the vehicle 10. Thus, the hydraulic pressures Pc1, Pc2, Pb1, Pb2 are hydraulic pressures supplied to the step-variable transmission portion 20.

In the step-variable transmission portion 20, selected ones of rotary elements of the first and second planetary gear devices 36, 38 are connected to each other or to the intermediate transmitting member 30, casing 16 or output shaft 22, either directly or indirectly (selectively) through the engagement devices CB or a one-way clutch F1. The rotary elements of the first planetary gear device 36 consist of three rotary elements in the form of a sun gear S1, a carrier CA1 and a ring gear R1 that are rotatable relative to one another. The rotary elements of the second planetary gear device 38 consist of three rotary elements in the form of a sun gear S2, a carrier CA2 and a ring gear R2 that are rotatable relative to one another.

The step-variable transmission portion 20 is shifted to a selected one of a plurality of AT gear positions (speed positions) by engaging actions of selected ones of the engagement devices CB. The plurality of AT gear positions have respective different gear ratios (speed ratios) γat (=AT input rotational speed Ni/output rotational speed No). Namely, the step-variable transmission portion 20 is shifted up or down from one gear position to another by placing selected ones of the engagement devices in the engaged state. The step-variable transmission portion 20 is a step-variable automatic transmission configured to establish a selected one a plurality of gear positions. In the following description of the present embodiment, the gear position established in the step-variable transmission portion 20 will be referred to as AT gear position. The AT input rotational speed Ni is an input rotational speed of the step-variable transmission portion 20 that is a rotational speed of the input rotary member of the step-variable transmission portion 20, which is equal to a rotational speed of the intermediate transmitting member 30, and which is equal to an MG2 rotational speed Nm that is an rotational speed of the second rotating machine MG2. Thus, the AT input rotational speed Ni can be represented by the MG2 rotational speed Nm. The output rotational speed No is a rotational speed of the output shaft 22 that is an output rotational speed of the step-variable transmission portion 20, which is considered to be an output speed of a transmission device (composite transmission) 40 which consists of the continuously-variable transmission portion 18 and the step-variable transmission portion 20. The transmission device 40 is a transmission that constitutes a part of a drive-force transmitting path between the engine 14 and the drive wheels 28.

Figures 2, 3:
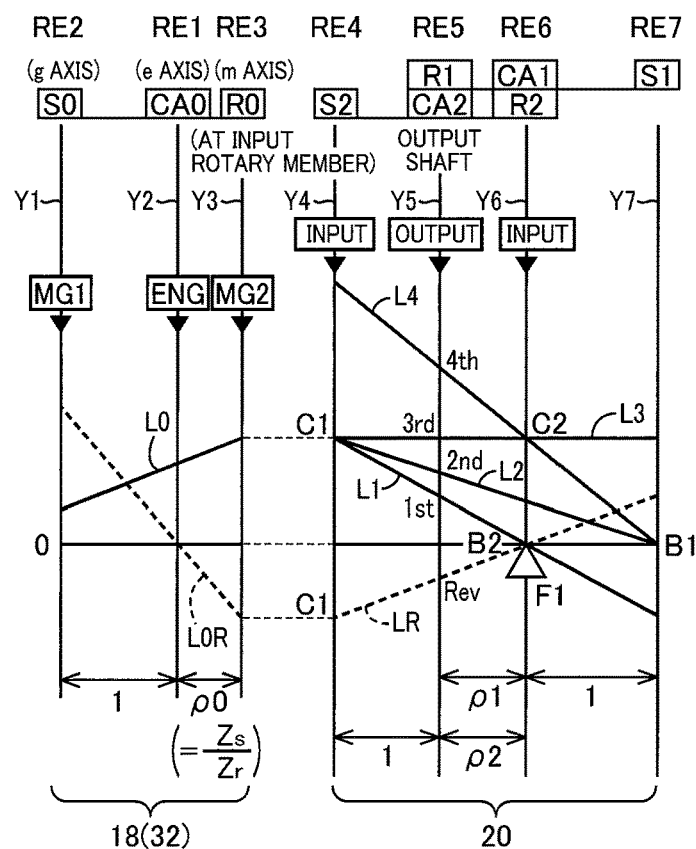
FIG. 2 is a table for explaining a relationship between each gear position of a mechanically-operated step-variable transmission portion (shown, by way of example, in FIG. 1) and a combination of engagement devices of the step-variable transmission portion (which are placed in engaged states to establish the gear position)
FIG. 3 is a collinear chart in which a relationship among rotational speeds of rotary elements of an electrically-controlled continuously-variable transmission portion and the mechanically-operated step-variable transmission portion, which are shown, by way of example in FIG. 1, can be represented by straight lines.

As shown in a table of FIG. 2, the step-variable transmission portion 20 is configured to establish a selected one of a plurality of AT gear positions in the form of four forward AT gear positions The four forward AT gear positions consist of a first speed AT gear position, a second speed AT gear position, a third speed AT gear position and a fourth speed AT gear position, which are represented by "1st", "2nd", "3rd" and "4th" in the table of FIG. 2. The first speed AT gear position is the lowest-speed gear position having a highest gear ratio γat, while the fourth speed AT gear position is the highest-speed gear position having a lowest gear ratio γat. The gear ratio γat decreases in the direction from the first speed AT gear position (lowest-speed gear position) toward the fourth speed AT gear position (highest-speed gear position). The table of FIG. 2 indicates a relationship between each of the AT gear positions of the step-variable transmission portion 20 and operation states of the respective engagement devices CB of the step-variable transmission portion 20, namely, a relationship between each of the AT gear positions and a combination of ones of the engagement devices CB, which are to be placed in theirs engaged states to establish the each of the AT gear positions. In the table of FIG. 2, "O" indicates the engaged state of the engagement devices CB, "A" indicates the engaged state of the brake B2 during application of an engine brake to the vehicle 10 or during a coasting shift-down action of the step-variable transmission portion 20, and the blank indicates the released state of the engagement devices CB.

The step-variable transmission portion 20 is configured to switch from one of the AT gear positions to another one of the AT gear positions, namely, to establish one of the AT gear positions which is selected, by the electronic control apparatus 90, according to, for example, an accelerating operation made by a vehicle driver (operator) and the vehicle running speed V. The step-variable transmission portion 20 is shifted up or down from one of the AT gear positions to another, for example, by so-called "clutch-to-clutch" shifting operation that is made by releasing and engaging actions of selected two of the engagement devices CB, namely, by a releasing action of one of the engagement devices CB and an engaging action of another one of the engagement devices CB. In the following description of the present embodiment, a shift down action from the second speed AT gear position to the first speed AT gear position will be referred to as shift-down action from 2nd to 1st. The other shift down and up actions will be referred in the same way.

FIG. 3 is a collinear chart in which a relative relationship of rotational speeds of the rotary elements in the continuously-variable transmission portion 18 and the step-variable transmission portion 20, can be represented by straight lines; In FIG. 3, three vertical lines Y1, Y2, Y3 corresponding to the three rotary elements of the differential mechanism 32 constituting the continuously-variable transmission portion 18 are a g-axis representative of the rotational speed of the sun gear S0 corresponding to a second rotary element RE2, an e-axis representative of the rotational speed of the carrier CA0 corresponding to a first rotary element RE1, and an m-axis representative of the rotational speed of the ring gear R0 corresponding to a third rotary element RE3 (i.e., the input rotational speed of the step-variable transmission portion 20) in order from the left side. Four vertical lines Y4, Y5, Y6, Y7 of the step-variable transmission portion 20 are axes respectively representative of the rotational speed of the sun gear S2 corresponding to a fourth rotary element RE4, the rotational speed of the ring gear R1 and the carrier CA2 connected to each other and corresponding to a fifth rotary element RE5 (i.e., the rotational speed of the output shaft 22), the rotational speed of the carrier CA1 and the ring gear R2 connected to each other and corresponding to a sixth rotary element RE6, and the rotational speed of the sun gear S1 corresponding to a seventh rotary element RE7 in order from the left. An interval between the vertical lines Y1, Y2, Y3 is determined in accordance with a gear ratio ρ0 of the differential mechanism 32. An interval between the vertical lines Y4, Y5, Y6, Y7 is determined in accordance with gear ratios ρ1, ρ2 of the first and second planetary gear devices 36, 38. When an interval between the sun gear and the carrier is set to an interval corresponding to "1" in the relationship between the vertical axes of the collinear chart, an interval corresponding to the gear ratio ρ (=the number Zs of teeth of the sun gear/the number Zr of teeth of the ring gear) of the planetary gear device is set between the carrier and the ring gear, since each of the differential mechanism 32 and planetary gear devices 36, 38 is a planetary gear device of a single-pinion type.

In representation using the collinear chart of FIG. 3, in the differential mechanism 32 of the continuously-variable transmission portion 18, the engine 14 (see "ENG" in FIG. 3) is connected to the first rotary element RE1; the first rotating machine MG1 (see "MG1" in FIG. 3) is connected to the second rotary element RE2; the second rotating machine MG2 (see "MG2" in FIG. 3) is connected to the third rotary element RE3 that is to be rotated integrally with the intermediate transmitting member 30; and therefore, the rotation of the engine 14 is transmitted via the intermediate transmitting member 30 to the step-variable transmission portion 20. In the continuously-variable transmission portion 18, the relationship between the rotational speed of the sun gear S0 and the rotational speed of the ring gear R0 is indicated by straight lines L0 and L0R crossing the vertical line Y2.

In the step-variable transmission portion 20, the fourth rotary element RE4 is selectively connected through the clutch C1 to the intermediate transmitting member 30; the fifth rotary element RE5 is connected to the output shaft 22; the sixth rotary element RE6 is selectively connected through the clutch C2 to the intermediate transmitting member 30 and selectively connected through the brake B2 to the casing 16; and the seventh rotary element RE7 is selectively connected through the brake B1 to the casing 16. In the step-variable transmission portion 20, the rotational speeds of the output shaft 22 at the first speed AT gear position "1st", second speed AT gear position "2nd", third speed AT gear position "3rd" and fourth speed AT gear position "4th" are indicated by respective straight lines L1, L2, L3, L4 crossing the vertical line Y5 in accordance with engagement/release control of the engagement devices CB.

The straight line L0 and the straight lines L1, L2, L3, L4 indicated by solid lines in FIG. 3 indicate the relative rotational speeds of the rotary elements during forward running in a hybrid running mode enabling a hybrid running in which at least the engine 14 is used as the drive force source for driving the vehicle 10. In this hybrid running mode, when a reaction torque, i.e., a negative torque from the first rotating machine MG1, is inputted in positive rotation to the sun gear S0 with respect to the engine torque Te inputted to the carrier CA0 in the differential mechanism 32, an engine direct transmission torque Td [=Te/(1+ρ0)=−(1/ρ0)×Tg] appears in the ring gear R0 as a positive torque in positive rotation. A combined torque of the engine direct transmission torque Td and the MG2 torque Tm is transmitted as the drive torque of the vehicle 10 in the forward direction depending on a required drive force to the drive wheels 28 through the step-variable transmission portion 20 having any AT gear position formed out of the first through fourth speed AT gear positions ("1st"-"4th"). In this case, the first rotating machine MG1 functions as an electric generator generating a negative torque in positive rotation. A generated electric power Wg of the first rotating machine MG1 is stored in the battery 54 or consumed by the second rotating machine MG2. The second rotating machine MG2 outputs the MG2 torque Tm by using all or a part of the generated electric power Wg or using the electric power from the battery 54 in addition to the generated electric power Wg.

In the differential mechanism 32 during a motor drive mode in which the vehicle 10 is driven with a drive force generated by the second rotating machine MG2 operated as a drive power source while the engine 14 is stopped (held at rest), the carrier CA0 is held stationary while the MG2 torque Tm that is a positive torque is applied to the ring gear R0 and rotating the ring gear R0 in the positive direction. The state of the differential mechanism 32 in this motor drive mode is not shown in the collinear chart of FIG. 3. At this time, the first rotating machine MG1 connected to the sun gear S0 is placed in a non-load state and freely rotatable in the negative direction. Namely, in the motor drive mode, the engine 14 is held in its non-operated state, so that an rotating speed we of the engine 14 (engine rotating speed we) is kept zero, and the vehicle 10 is driven in the forward direction with the MG2 torque Tm (positive forward drive torque), which is transmitted as a forward drive torque to the drive wheels 28 through the step-variable transmission portion 20 placed in one of the first through fourth speed AT gear positions ("1st"-"4th"). During the forward running in the motor running mode, the MG2 torque Tm is a power running torque that is a positive torque in positive rotation.

The straight lines L0R and LR indicated by broken lines in FIG. 3 indicate the relative speeds of the rotary elements in reverse running in the motor running mode. During reverse running in this motor running mode, the MG2 torque Tm is inputted to the ring gear R0 as a negative torque in negative rotation, and the MG2 torque Tm is transmitted as the drive torque of the vehicle 10 in a reverse direction to the drive wheels 28 through the step-variable transmission portion 20 in which the AT first gear position "1st" is established. The vehicle 10 can perform the reverse running when the electronic control apparatus 90 causes the second rotating machine MG2 to output a reverse MG2 torque Tm having a positive/negative sign opposite to a forward MG2 torque Tm during forward running while a forward low-side AT gear position, for example, the AT first gear position "1st", is established as one the plurality of AT gear positions. During the reverse running in the motor running mode, the MG2 torque Tm is a power running torque that is a negative torque in negative rotation. In this case, the forward MG2 torque Tm is a power running torque that is a positive torque in positive direction, and the reverse MG2 torque Tm is a power running torque that is a negative torque in negative direction. An intersection "Rev" between the vertical line Y5 and the straight line LR represents the rotational speed of the output shaft 22 during the reverse running. In this way, the vehicle 10 performs the reverse running by inverting positiveness/negativeness of the MG2 torque Tm with the forward AT gear position. Using the forward AT gear position means using the same AT gear position as when the forward running is performed. Even in the hybrid running mode, the reverse running can be performed as in the motor running mode, for example, by placing the first rotating machine MG1 in the non-load state and causing the second rotating machine MG2 to be rotated in negative direction such that the engine rotational speed Ne is kept in an idling rotational speed.

In the drive-force transmitting device 12, the continuously-variable transmission portion 18 constitutes an electric transmission mechanism that includes the differential mechanism 32 having three rotary elements, wherein the three rotary elements consist of the first rotary element RE1 in the form of the carrier CA0 to which the engine 14 is connected in a drive-force transmittable manner, the second rotary element RE2 in the form of the sun gear S0 to which the first rotating machine MG1 is connected in a drive-force transmittable manner, and the third rotary element RE3 in the form of the ring gear R0 to which the intermediate transmitting member 30 is connected, and wherein the differential state of the differential mechanism 32 is controlled by controlling the operation state of the first rotating machine MG1. The continuously-variable transmission portion 18 is operated as an electric continuously variable transmission driven to change a gear ratio γ0 (=Ne/Nm) that is a ratio of the engine rotational speed Ne to the MG2 rotational speed Nm, wherein the engine rotational speed Ne is equal to the rotational speed of the connecting shaft 34 serving as an input rotary member of the continuously-variable transmission portion 18 while the MG2 rotational speed Nm is equal to the rotational speed of the intermediate transmitting member 30 serving as an output rotating member of the continuously-variable transmission portion 18.

For example, in the hybrid running mode, when the rotational speed of the sun gear S0 is increased or reduced by controlling the rotational speed of the first rotating machine MG1 relative to the rotational speed of the ring gear R0 that is restrained by the rotation of the drive wheels 28 since one of the AT gear positions is established in the step-variable transmission portion 20, the rotational speed of the carrier CA0, i.e., the engine rotational speed Ne, is increased or reduced. Therefore, in the hybrid running, the engine 14 can be operated at an efficient operating point. Thus, a continuously variable transmission can be constituted by cooperation of the step-variable transmission portion 20 having one of the AT gear position is established therein and the continuously-variable transmission portion 18 operated as a continuously variable transmission, as the whole of the transmission device 40 in which the continuously-variable transmission portion 18 and the step-variable transmission portion 20 are arranged in series.

Alternatively, since a shifting operation can be performed in the continuously-variable transmission portion 18 as in a step-variable transmission, a shifting operation can be performed as in a step-variable transmission by using the step-variable transmission portion 20 having one of the AT gear positions established therein and the continuously-variable transmission portion 18 in which a shifting operation is performed as in a step-variable transmission, as the whole of the transmission device 40. In other words, in the transmission device 40, the step-variable transmission portion 20 and the continuously-variable transmission portion 18 can be controlled so as to selectively establish a plurality of gear positions that are different in the gear ratio γt (=Ne/No) indicative of the ratio of the engine rotational speed Ne to the output rotational speed No. In the present embodiment, the gear position established in the transmission device 40 is referred to as an overall speed position (although it may be referred also to as a conceptual speed position). The gear ratio γt is an overall gear ratio of the transmission device 40 consisting of the continuously-variable transmission portion 18 and the step-variable transmission portion 20 which are disposed in series with each other. The overall gear ratio γt is equal to a product of the gear ratio γ0 of the continuously-variable transmission portion 18 and the gear ratio γat of the step-variable transmission portion 20, namely, γt=γ0×γat.

For example, the overall speed position is assigned such that one or more types are established for each of the AT gear positions of the step-variable transmission portion 20 by combining the AT gear positions of the step-variable transmission portion 20 with one or more types of the gear ratio γ0 of the continuously-variable transmission portion 18. For example, the overall speed position is defined in advance such that first through third overall speed positions are established for the first speed AT gear position "1st", the fourth through sixth overall speed positions are established for the second speed AT gear position "2nd", seventh through ninth overall speed positions are established for the third speed AT gear position "3rd", and the tenth overall speed position is established for the fourth speed AT gear position "4th". In the transmission device 40, the continuously-variable transmission portion 18 is controlled to attain the engine rotational speed Ne by which a desired overall gear ratio γt (i.e., one of a plurality of overall gear ratios γt) is established for the output rotational speed No, so that different speed positions are established with a certain AT gear position being established in the step-variable transmission portion 20. Further, in the transmission device 40, the continuously-variable transmission portion 18 is controlled with switching of the AT gear position in the step-variable transmission portion 20 whereby the overall speed position is switched.

Referring back to FIG. 1, the vehicle 10 is provided with the electronic control apparatus 90 as a controller configured to execute various control operations such as an output control operation for the engine 14, a shift control operation for the continuously-variable transmission portion 18 and a shift control operation for the step-variable transmission portion 20. FIG. 1 is a view showing also an input/output system of the electronic control apparatus 90, and is a functional block diagram for explaining major control functions and control portions of the electronic control apparatus 90. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 may be constituted by two or more control units exclusively assigned to perform different control operations such as the engine control operation and the shift control operations, as needed.

The electronic control apparatus 90 receives various input signals based on values detected by respective sensors provided in the vehicle 10. Specifically, the electronic control apparatus 90 receives: an output signal of an engine speed sensor 60 indicative of an engine rotational speed Ne which is a rotational speed of the engine 14; an output signal of an output speed sensor 62 indicative of an output-shaft rotational speed No which is a rotational speed of the output shaft 22 and which corresponds to the running speed V of the vehicle 10; an output signal of a MG1 speed sensor 64 indicative of an MG1 rotational speed Ng which is a rotational speed of the first rotating machine MG1; an output signal of a MG2 speed sensor 66 indicative of an MG2 rotational speed Nm which is a rotational speed of the second rotating machine MG2 and which corresponds to an AT input rotational speed Ni; an output signal of an accelerator-opening degree sensor 68 indicative of an acceleration opening degree θacc representing an amount of accelerating operation made by the vehicle driver; an output signal of a throttle-opening degree sensor 70 indicative of a throttle opening degree θth; an output signal of a brake pedal sensor 71 indicative of a brake-ON signal Bon representing a state of depression of a brake pedal by the vehicle driver to operate wheel brakes (service brake) and also a braking operation amount Bra representing an amount of depression of the brake pedal by the vehicle driver corresponding to a depressing force applied to the brake pedal; an output signal of a steering sensor 72 indicative of a steering angle θsw and a steering direction Dsw of a steering wheel provided in the vehicle 10 and also a steering ON signal SWon representing a state in which the steering wheel is being held by the vehicle driver; an output signal of a driver condition sensor 73 indicative of a driver condition signal Drv representing a condition of the vehicle driver; an output signal of a G senor 74 indicative of a longitudinal acceleration Gx and a lateral acceleration Gy of the vehicle 10; an output signal of a yaw rate sensor 76 indicative of a yaw rate Ryaw that is an angular speed around a vertical axis of the vehicle 10; an output signal of a battery sensor 78 indicative of a battery temperature THba, a charging/discharging electric current that and a voltage Vbat of the battery 54; an output signal of a fluid temperature sensor 79 indicative of a working fluid temperature THoil that is a temperature of the working fluid supplied to the hydraulic actuators of the engagement devices CB; an output signal of a vehicle-area information sensor 80 indicative of vehicle area information Iard that is detected by, for example, a camera and a distance sensor; an output signal of a GPS (Global Positioning System) antenna 81 indicative of GPS signal Sgps; an output signal of an external-network communication antenna 82 indicative of an communication signal Scom; an output signal of a navigation system 83 indicative of navigation information Inavi; output signals of drive-assist setting switches 84 each indicative of drive-assist setting signals Sset representing a setting made by the vehicle driver for execution of a drive-assist control such as automatic drive control and an auto-cruise control; and an output signal of a shift position sensor 85 indicative of an operation position POSsh of a shift lever provided in the vehicle 10.

The driver condition sensor 73 includes a camera configured to photograph, for example, a facial expression and pupils of eyes of the vehicle driver and/or a biometric information sensor configured to detect biometric information of the vehicle driver, so as to detect or obtain directions of his or her eyes and face, movements of his or her eye balls and face and condition of his or her heartbeat, for example.

The vehicle-area information sensor 80 includes a lidar (Light Detection and Ranging), a radar (Radio Detection and Ranging) and/or an onboard camera, for example, so as to directly obtain information related to a road on which the vehicle 10 is running and information related to an object or objects present around the vehicle 10. The lidar is constituted by, for example, a plurality of lidar units configured to detect objects present in the respective front, lateral and rear sides of the vehicle 10, or a single lidar unit configured to detect objects present all around the vehicle 10. The lidar is configured to output, as the vehicle area information Iard, object information that is information related to the detected object or objects. The radar is constituted by, for example, a plurality of radar units configured to detect objects present in the respective front, front vicinity and rear vicinity of the vehicle 10, and to output, as the vehicle area information Iard, object information that is information related to the detected object or objects. The object information outputted as the vehicle area information Iard by the lidar and the radar includes a distance and a direction of each of the detected objects from the vehicle 10. The onboard camera is, for example, a monocular camera or a stereo camera which is provided on a rear side of a front window of the vehicle 10 and is configured to capture an image front side of the vehicle 10, and to output, as the vehicle area information Iard, captured image information that is information related to the captured image. The captured image information outputted as the vehicle area information Iard by the onboard camera includes information related to lanes of a running road, signs and parking spaces present on the running road, and other vehicles, pedestrians and obstacles present on the running road.

The drive-assist setting switches 84 include an automatic-drive selecting switch for executing the automatic drive control, a cruise switch for executing the cruise control, a switch for setting the vehicle running speed in execution of the cruise control, a switch for setting a distance from another vehicle preceding the vehicle 10 in execution of the cruise control, and a switch for executing a lane keeping control for keeping the vehicle 10 to run within a selected road lane.

The communication signal Scom includes road traffic information that is transmitted and received to and from a center that is an external device such as a server and a road traffic information communication system, and/or inter-vehicle communication information that is directly transmitted and received to and from the other vehicles present in the vicinity of the vehicle 10 without via the center. The road traffic information includes information related to traffic jams, accidents, road constructions, required travel times, and parking lots on roads. The inter-vehicle communication information includes vehicle information, running information, traffic environment information. The vehicle information includes information indicative of a vehicle type of each of the other vehicles such as passenger vehicle, truck, and two-wheel vehicle. The running information includes information related to the other vehicles such as information indicative of the vehicle speed V, location information, brake-pedal operation information, turn-signal-lamp blinking information, and hazard-lamp blinking information. The traffic environment information includes information related to traffic jams and road constructions.

The navigation information Inavi includes map information such as road information and facility information that are based on the map data pre-stored in the navigation system 83. The road information includes information related to types of roads (such as urban roads, suburban roads, mountain roads and highway load), branching and merging of roads, road gradients, and running speed limits. The facility information includes information of types, locations, names of sites such as supermarkets, shops, restaurants, parking lots, parks, places for repairing the vehicle 10, a home of vehicle's owner and service areas located on the highway load. The service areas are sites which are located on, for example, the highway load, and in which there are facilities for parking, eating, and refueling.

The navigation system 83 is configured to specify a location of the vehicle 10 on pre-stored map data, based on the GPS signal Sgps, and to indicate the location of the vehicle 10 on the map displayed on a display device 89. The navigation system 83 receives a destination point inputted thereto, calculates a running route from a departure point to the destination point, and informs, as instructions, the vehicle driver of the running route, for example, through the display device 89 and a speaker. The display device 89 is constituted by, for example, a multi-display device which is configured to receive a touch operation, and which is to be used for various purposes other than for the navigation system 83, such that maintenance information related to inspection of the vehicle 10 also can be displayed in the display device 89, for example. Further, the display device 89 may be configured not only to display information, but also to provide information by emitting sounds such as voice and music sound.

The electronic control apparatus 90 generates various output signals to the various devices provided in the vehicle 10, such as: an engine control command signal Se that is to be supplied to the engine control device 50 for controlling the engine 14, rotating-machine control command signals Smg that are to be supplied to the inverter 52 for controlling the first and second rotating machines MG1, MG2; a hydraulic control command signal Sat that is to be supplied to the hydraulic control unit 56 for controlling the operation states of the engagement devices CB; the communication signal Scom that is to be supplied to the external-network communication antenna 82; a brake-control command signal Sbra that is supplied to a wheel brake device 86, for controlling a braking torque generated by the wheel brake device 86; a steering-control command signal Sste that is to be supplied to a steering device 87, for controlling steering of wheels (especially, front wheels) of the vehicle 10; and an information-notification-control command signal Sinf that is to be supplied to an information notification device 88, for warning and notifying information to the vehicle driver.

The wheel brake device 86 is a brake device including wheel brakes each of which is configured to apply a braking torque to a corresponding one of the wheels that include the drive wheels 28 and driven wheels (not shown). The wheel brake device 86 supplies a brake hydraulic pressure to a wheel cylinder provided in each of the wheel brakes in response to a depressing operation of the brake pedal by the vehicle driver, for example. In the wheel brake device 86, normally, a brake master cylinder is configured to generate a master-cylinder hydraulic pressure whose magnitude corresponds to the depressing force applied to the brake pedal, and the generated master-cylinder hydraulic pressure is supplied as the brake hydraulic pressure to the wheel cylinder. On the other hand, in the wheel brake device 86, for example, during execution of an ABS control, an anti-skid control, a vehicle-running-speed control or an automatic drive control, the brake hydraulic pressure required for execution of such a control is supplied to the wheel cylinder for enabling the wheel cylinder to generate the required braking torque.

The steering device 87 is configured to apply an assist torque to a steering system of the vehicle 10 in accordance with the vehicle running speed V, steering angle θsw, steering direction Dsw and yaw rate Ryaw, for example. For example, during execution of the automatic driving control, the steering device 87 applies a torque for controlling the steering of the front wheels, to the steering system of the vehicle 10.

The information notification device 88 is configured to give a warning or notification to the vehicle driver in even of a failure in some components involved in the running of the vehicle 10 or deterioration in the functions of the components, for example. The information notification device 88 is constituted by, for example, a display device such as a monitor, a display and an alarm lamp, and/or a sound output device such as a speaker and a buzzer. The display device may be constituted by the above-described display device 89, and is configured to visually give a warning or notification to the vehicle driver. The sound output device is configured to aurally give a warning or notification to the vehicle driver.

For performing various control operations in the vehicle 10, the electronic control apparatus 90 includes a driving control means or portion in the form of a driving control portion 94, an AT shift control means or portion in the form of an AT shift control portion 96, and a hybrid control means or portion in the form of a hybrid control portion 98.

The driving control portion 94 is capable of executing, as a drive control for driving the vehicle 10, a selected one of (i) an autonomous drive control for driving the vehicle 10 in accordance with driving operations made by the vehicle driver and (ii) an automatic drive control for driving the vehicle 10 by executing the drive control without depending on the driving operations made by the vehicle driver, by automatically determining a target driving state based on, for example, the map information and the destination point inputted by the vehicle driver, and accelerating, decelerating and steering the vehicle 10 depending on the determined target driving state. The autonomous drive control is for causing the vehicle 10 to run by an autonomous drive based on the driving operations made by the vehicle driver, and is a manual drive control is for causing the vehicle 10 to run by a manual drive based on the driving operation made by the vehicle driver. The autonomous drive is a driving method for causing the vehicle 10 to run in an ordinary manner by the vehicle driver's driving operations such as an accelerating operation, a barking operation and a steering operation. The automatic drive control is for causing the vehicle 10 to run by an automatic drive, which is a driving method for causing the vehicle 10 to run, for example, by automatically accelerating, decelerating, braking and steering the vehicle 10, by controls executed by the electronic control apparatus 90, based on the signals and information supplied from the various sensors, without depending on the driving operations made by the vehicle driver, namely, without depending on intentions of the vehicle driver.

When an automatic drive mode is not selected with the automatic-drive selecting switch of the drive-assist setting switches 84 being placed in OFF, the driving control portion 94 establishes an autonomous drive mode so as to execute the autonomous. The driving control portion 94 executes the autonomous drive control by outputting commands for controlling the step-variable transmission portion 20, engine 14 and first and second rotating machines MG1, MG2, wherein the commands are supplied to the AT shift control portion 96 and the hybrid control portion 98.

When the automatic drive mode is selected with the automatic-drive selecting switch of the drive-assist setting switches 84 being placed in ON by the vehicle driver, the driving control portion 94 establishes the automatic drive mode so as to execute the automatic drive control. Specifically, the driving control portion 94 automatically sets a target driving state that is dependent on, for example, various settings (such as the destination point, a degree of priority of fuel economy, a vehicle running speed and a distance from another vehicle preceding the vehicle 10) inputted by the vehicle driver, own-vehicle location information based on the GPS signal Sgps, information based on the navigation information Inavi and/or the communication signal Scom, and information based on the vehicle area information Iard, wherein the information based on the navigation information Inavi and/or the communication signal Scom includes the map information such as a running road condition (e.g., curve, slope, altitude, legal speed limit), infrastructure information and weather information, and wherein the information based on the vehicle area information Iard includes information related to lanes of a running road, signs present on the running road, and other vehicles and pedestrians present on the running road. The driving control portion 94 executes the automatic drive control by automatically accelerating, decelerating and steering the vehicle 10, based on the set target driving state, wherein the decelerating may include braking the vehicle 10.

The driving control portion 94 determines, as the above-described target driving state, a target route, a target course, a target running speed, a target drive torque and/or a target acceleration/deceleration, wherein the target running speed is to be determined by taking account of a safety margin based on an actual distance to the preceding vehicle, and wherein each of the target drive torque and the target acceleration/deceleration is to be determined depending on the target running speed and a running resistance. The running resistance may be, for example, a value set in advance by the driver for the vehicle 10, a value based on the map information obtained through communication with the external device and/or vehicle specifications, or an estimated value calculated based on, for example, a gradient of a road, an actual drive amount, an actual longitudinal acceleration Gx during running. The driving control portion 94 outputs commands to the AT shift control portion 96 and the hybrid control portion 98 for respectively controlling the step-variable transmission portion 20, the engine 14, and the rotating machines MG1, MG2 so as to obtain the target drive torque. When the target drive torque is a negative torque value, namely, when a braking torque needs to be generated, an engine braking torque generated by the engine 14, a regenerative braking torque generated by the second rotating machine MG2 and/or a wheel braking torque generated by the wheel brake device 86 is applied to the vehicle 10. For example, the driving control portion 94 calculates, as the wheel braking torque, a braking torque value that is an available torque value, and then outputs the brake-control command signal Sbra to the wheel brake device 86, so as to cause the wheel brake device 86 to generate the calculated braking torque value as the wheel braking torque, for thereby obtaining the target drive torque. In addition, the driving control portion 94 outputs the steering-control command signal Sste to the steering device 87, for thereby controlling steering of the front wheels based on the set target driving state.

Figure 4:
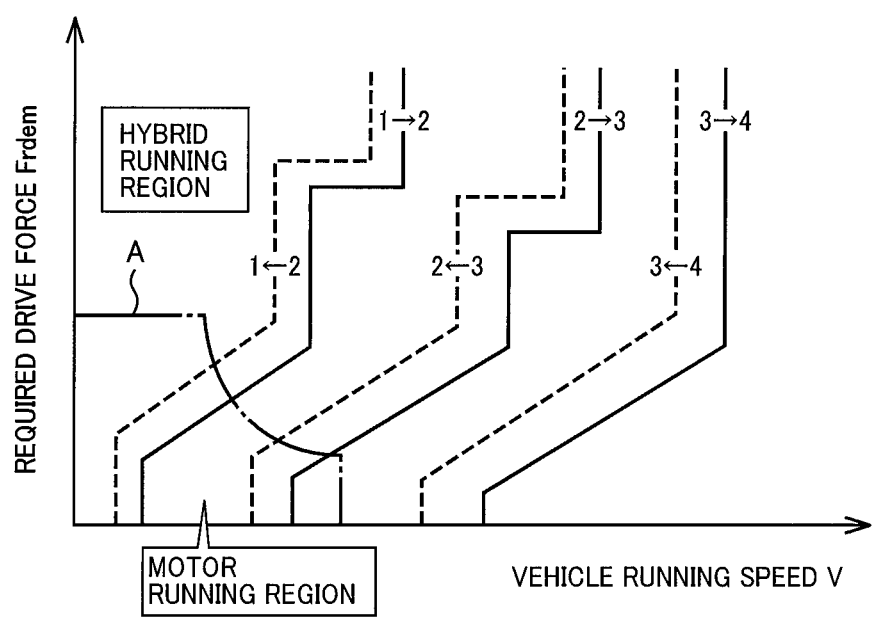
FIG. 4 is a view showing, by way of examples, a shifting map used for executing a shift control operation in the mechanically-operated step-variable transmission portion, and a drive-force-source switching map used for switching between a hybrid running and a motor running.

The AT shift control portion 96 executes the shift control operation in the step-variable transmission portion 20 in accordance with a predetermined shift control program, wherein the shift control operation includes a hydraulic control operation executed for the engagement devices CB involved in the shift control operation in the step-variable transmission portion 20 as the automatic transmission. Specifically, the AT shift control portion 96 determines a shifting action of the step-variable transmission portion 20, by using, for example, an AT-gear-position shift map as shown in FIG. 4, which is a relationship obtained through experimentation or determined by an appropriate design theory, and executes the shift control operation in the step-variable transmission portion 20 as needed. The AT shift control portion 96 outputs the hydraulic control command signal Sat to the hydraulic control unit 56, for switching the operation states of the engagement devices CB by operations of the solenoid valves SL1-SL4, such that the AT gear position of the step-variable transmission portion 20 is automatically switched. The AT gear position shifting map is a predetermined relationship between two variables in the form of the vehicle running speed V and the required drive force Frdem, for example, which relationship is used to determine a shifting action of the step-variable transmission portion 20 and is represented by shifting lines in two-dimensional coordinates in which the running speed V and the required drive force Frdem are taken along respective two axes. It is noted that one of the two variables may be the output rotational speed No in place of the vehicle running speed V and that the other of the two variables may be the required drive torque Trdem, accelerator opening degree θacc or throttle valve opening degree θth in place of the required drive force Frdem. The shifting lines in the AT gear position shifting map consist of shift-up lines (indicated by solid lines in FIG. 4) for determining a shift-up action of the step-variable transmission portion 20, and shift-down lines (indicated by broken lines in FIG. 4) for determining a shift-down action of the step-variable transmission portion 20. In execution of the automatic drive control, the target drive force and target drive torque may be used as the required drive force Frdem and required drive torque Trdem, respectively.

The hybrid control portion 98 has a function serving as an engine control means or portion for controlling the operation of the engine 14 and a function serving as a rotating machine control means or portion for controlling the operations of the first rotating machine MG1 and the second rotating machine MG2 via the inverter 52, and executes a hybrid drive control, for example, using the engine 14, the first rotating machine MG1 and the second rotating machine MG2 through these control functions. The hybrid control portion 98 calculates a drive request amount in the form of the required drive force Frdem that is to be applied to the drive wheels 28, by applying the accelerator opening degree θacc and the vehicle running speed V to, for example, a drive request amount map that is a predetermined relationship. The required drive torque Trdem [Nm] applied to the drive wheels 28, a required drive power Prdem [W] applied to the drive wheels 28, a required AT output torque applied to the output shaft 22, etc. may be used as the drive request amount, in addition to the required drive force Frdem [N]. In execution of the automatic drive control, the target drive force and target drive torque may be used as the required drive force Frdem and required drive torque Trdem, respectively.

The hybrid control portion 98 outputs the engine control command signal Se for controlling the engine 14 and the rotating-machine control command signals Smg for controlling the first and second rotating machines MG1, MG2, such that the required drive power Prdem is obtained. The engine control command signal Se is, for example, a command value of an engine power Pe that is the power of the engine 14 outputting the engine torque Te at the current engine rotation speed Ne. The rotating-machine control command signal Smg is, for example, a command value of the generated electric power Wg of the first rotating machine MG1 outputting the MG1 torque Tg as the reaction torque of the engine torque Te at the MG1 rotation speed Ng which is the MG1 rotation speed Ng at the time of command signal Smg output, and is a command value of a consumed electric power Wm of the second rotating machine MG2 outputting the MG2 torque Tm at the MG2 rotation speed Nm which is the MG2 rotation speed Nm at the time of command signal Smg output.

For example, when the transmission device 40 is operated as a continuously variable transmission as a whole by operating the continuously variable transmission portion 18 as a continuously variable transmission, the hybrid control portion 98 controls the engine 14 and controls the generated electric power Wg of the first rotating machine MG1 so as to attain the engine rotational speed Ne and the engine torque Te at which the engine power Pe achieving the required drive power Prdem is acquired in consideration of an engine optimum fuel consumption point etc., and thereby provides the continuously variable shift control of the continuously variable transmission portion 18 to change the gear ratio γ0 of the continuously variable transmission portion 18. As a result of this control, the gear ratio γt of the transmission device 40 is controlled in the case of operating the transmission device 40 as a continuously variable transmission.

For example, when the transmission device 40 is operated as a step-variable transmission as a whole by operating the continuously variable transmission portion 18 as in a step-variable transmission, the hybrid control portion 98 uses a predetermined relationship, for example, an overall speed position shift map, to determine a shifting action of the transmission device 40 and provides the shift control of the continuously variable transmission portion 18 so as to selectively establish the plurality of overall speed positions in coordination with the shift control of the AT gear position of the step-variable transmission portion 20 by the AT shift control portion 96. The plurality of overall speed positions can be established by controlling the engine rotational speed Ne by the first rotating machine MG1 in accordance with the vehicle speed V so as to maintain the respective gear ratios γt. The gear ratio γt of each of the overall speed positions may not necessarily be a constant value over the entire region of the vehicle speed V and may be changed in a predetermined region or may be limited by an upper limit, a lower limit, etc. of the rotational speed of each rotary member or element. As described above, the hybrid control portion 98 can provide the shift control in which the engine rotational speed Ne is changed as in a step-variable shift. An overall step-variable shift control of causing the transmission device 40 to perform a shift as in a step-variable transmission as a whole may be provided only in priority to the continuously variable shift control of operating the transmission device 40 as a continuously variable transmission as a whole in the case that, for example, the vehicle driver selects a running mode placing emphasis on running performance such as a sports running mode etc. or the required drive torque Trdem is relatively large; however, the overall step-variable shift control may basically be provided except when a predetermined restriction is placed on provision.

The hybrid control portion 98 selectively establishes the motor running mode or the hybrid running mode as the running mode depending on a driving state, so as to cause the vehicle 10 to run in a selected one of the running modes. For example, the hybrid control portion 98 establishes the motor running mode when the required drive power Prdem is in a motor running region smaller than a predetermined threshold value, and establishes the hybrid running mode when the required drive power Prdem is in a hybrid running region equal to or greater than the predetermined threshold value. In FIG. 4, one-dot chain line A is a boundary line for switching the drive force source for driving the vehicle 10 between at least the engine 14 and only the second rotating machine MG2. That is, the one-dot chain line A of FIG. 4 is a boundary line between the hybrid running region and the motor running region for switching between the hybrid running and the motor running. A predetermined relationship having the boundary line as indicated by the one-dot chain line A of FIG. 4 is an example of a drive-force source switching map defined by the two-dimensional coordinates of variables in the form of the vehicle running speed V and the required drive force Frdem. It is noted that, in FIG. 4, the drive-force source switching map is shown together with AT gear position shift map, for convenience of the description. In execution of the automatic drive control, too, the similar drive-force source switching map may be used for switching between the motor running mode and the hybrid running mode.

Figure 5:
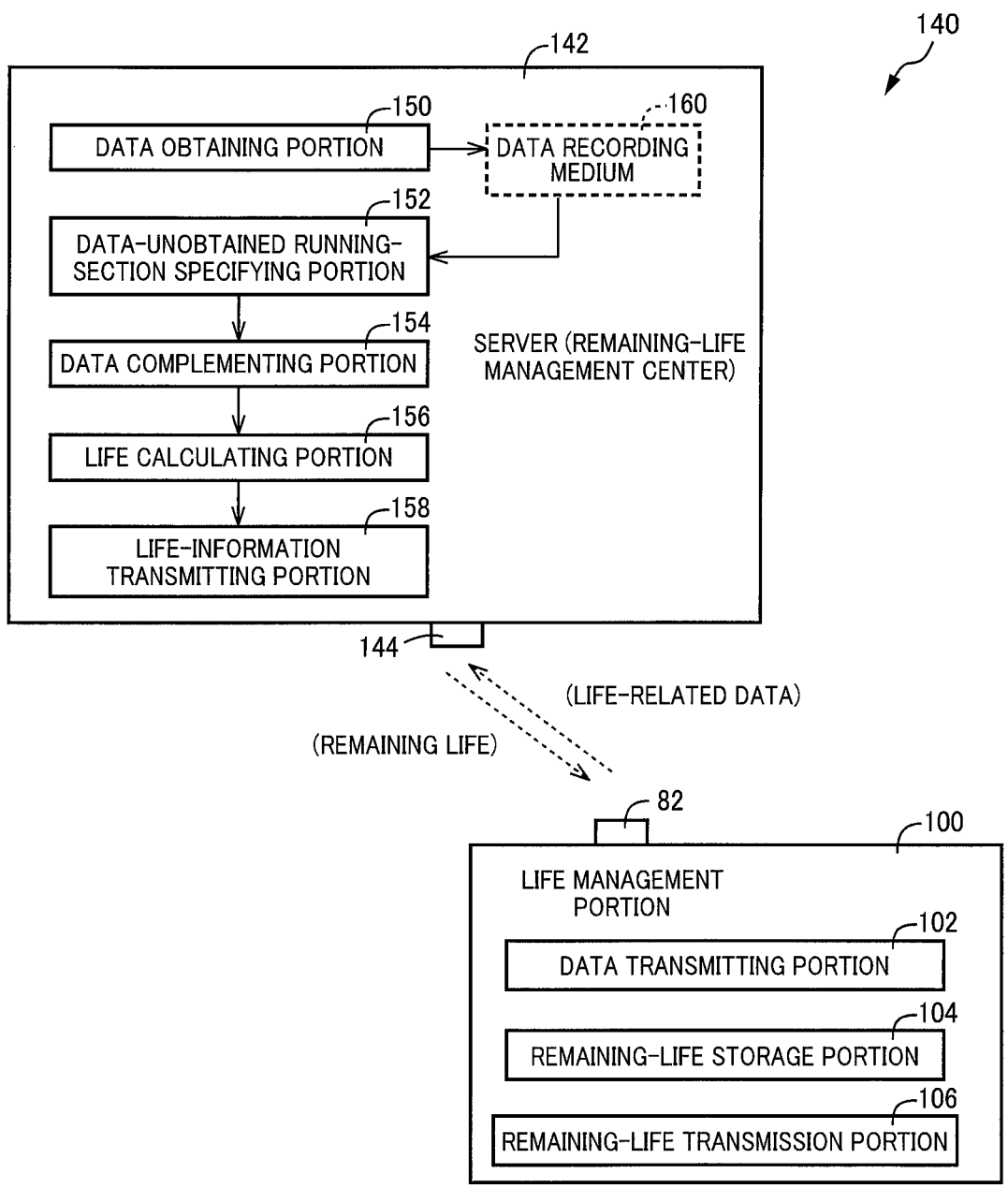
FIG. 5 is a block diagram for specifically explaining the remaining-life estimation apparatus shown in FIG. 1.

On the other hand, in the present embodiment, a remaining life of the step-variable transmission portion 20 as a vehicle component is predicated or estimated by the remaining-life estimation apparatus 140, and the estimated remaining life is displayed in the display device 89. The remaining-life estimation apparatus 140 includes a server 142 of a remaining-life management center provided outside the vehicle 10, in addition to a life management portion 100 provided in the electronic control apparatus 90 of the vehicle 10. FIG. 5 is a function block diagram showing a portion serving as the remaining-life estimation apparatus 140. The life management portion 100 is capable of transmitting and receiving various information to and from the server 142 of the remaining-life management center via the external-network communication antenna 82. The remaining-life management center is installed by, for example, a manufacturer of the vehicle 10, and includes a wireless communication device 144, so as to be capable of transmitting and receiving information to and from the life management portion 100 of the vehicle 10 through a wireless communication using, for example, a mobile phone network, a wireless LAN network and internet. The life management portion 100 transmits and receives the information to and from the server 142 by using the external-network communication antenna 82. However, apart from the external-network communication antenna 82, another communication device for the life management may be provided. The remaining-life management center corresponds to "data management center" recited in the appended claims.

The life management portion 100 provided in the electronic control apparatus 90 of the vehicle 10 functionally includes a data transmitting portion 102, a remaining-life storage portion 104 and a remaining-life transmission portion 106. The data transmitting portion 102 is configured, during running of the vehicle 10, to automatically transmit, to the server 142, various kinds of remaining-life-related data that influence the remaining life of the step-variable transmission portion 20. The step-variable transmission portion 20 is constituted by a multiplicity of component elements that relate to the remaining life of the step-variable transmission portion 20. Specifically, the component elements include the engagement devices CB, the output shaft 22, the planetary gear devices 36, 38, bearings (not shown) and an electrically-operated oil pump provided in the hydraulic control unit 56. The shortest one of the remaining lives of the respective component elements is regarded as the remaining life of the step-variable transmission portion 20 as a whole. Thus, the remaining-life-related data represent factors that influence the remaining lives of the respective component elements, i.e., loads and durabilities of the respective component elements. For example, the remaining-life-related data include: the torques (including negative torques) of the engine 14 and the second rotating machine MG2 as the driving force sources; the regenerative torque of the second rotating machine MG2 of the electrically-controlled continuously-variable transmission portion 18; the gear ratios γat of the AT gear positions of the step-variable transmission portion 20; the temperature THoil of lubricant fluid in the step-variable transmission portion 20; the output rotational speed No corresponding to the vehicle running speed V; an acceleration dV/dt of the vehicle 10; and maintenance information such as presence or absence of change of the lubricant fluid. A selected one of the AT gear positions, which are different from one another in terms of the drive-force transmitting path, is also transmitted as the remaining-life-related data. Although the acceleration dV/dt is calculated from change of the running speed V, an acceleration sensor may be provided to detect the acceleration dV/dt. Since the step-variable transmission portion 20 could be replaced by a new one, as needed, the remaining-life-related data related to the step-variable transmission portion 20 need to be managed in association with an identification of the step-variable transmission portion 20. To this end, the step-variable transmission portion 20 is individually provided with identification information in the form of a serial number (individual identification number), so that the remaining-life-related data are transmitted together with the serial number. A vehicle identification number identifying the vehicle 10 is also transmitted.

The running-related information is information that makes it possible to determine whether a data-reception failure case (in which the server 142 failed to receive the remaining-life-related data due to a communication environment such as a tunnel) corresponds to a data-unobtained running section in which the server 142 failed to receive the remaining-life-related data during running of the vehicle 10. The running-related information is appropriately a cumulative running distance Lc or a cumulative running time Tc, for example. When the cumulative running distance Lc or the cumulative running time Tc is changed discontinuously, it is possible to determine that a running distance or a running time in which the discontinuous change occurred corresponds to the data-unobtained running section. The cumulative running distance Lc and the cumulative running time Tc can be detected through an odometer and a timer, respectively, for example. In the present embodiment, the cumulative running distance Lc and the cumulative running time Tc are both transmitted as the running-related information. However, as the running-related information for determination of the data-unobtained running section, another cumulative amount that is added with running of the vehicle 10 or information of location of the vehicle 10 that is obtained through the GPS signal Sgps, also can be used.

The remaining-life storage portion 104 is configured to store, in a recording medium, remaining life information (i.e., information related to the remaining life), which is transmitted from the server 142. The remaining-life transmission portion 106 is configured to read out the remaining life information stored in the recording medium and to transmit the remaining life information to an outside of the vehicle 10, for example, by causing the display device 89 to display the remaining life information.

The server 142 includes a so-called microcomputer incorporating a CPU, a ROM, a RAM and an input-output interface. The server 142 functionally includes a data obtaining portion 150, a data-unobtained running-section specifying portion 152, a data complementing portion 154, a life calculating portion 156 and a life-information transmitting portion 158. The server 142 executes a signal processing, i.e., a control routine including steps S1 through S9 that are shown in a flow chart of FIG. 6. Steps S1 through S4 correspond to the data obtaining portion 150, step S5 corresponds to the data-unobtained running-section specifying portion 152, step S6 corresponds to the data complementing portion 154, steps S7 and S8 correspond to the life calculating portion 156, and step S9 corresponds to the life-information transmitting portion 158. In the present embodiment, the data complementing portion 154 and the life calculating portion 156 cooperate with each other to constitute "remaining-life calculating portion" recited in the appended claims.

Figure 6:
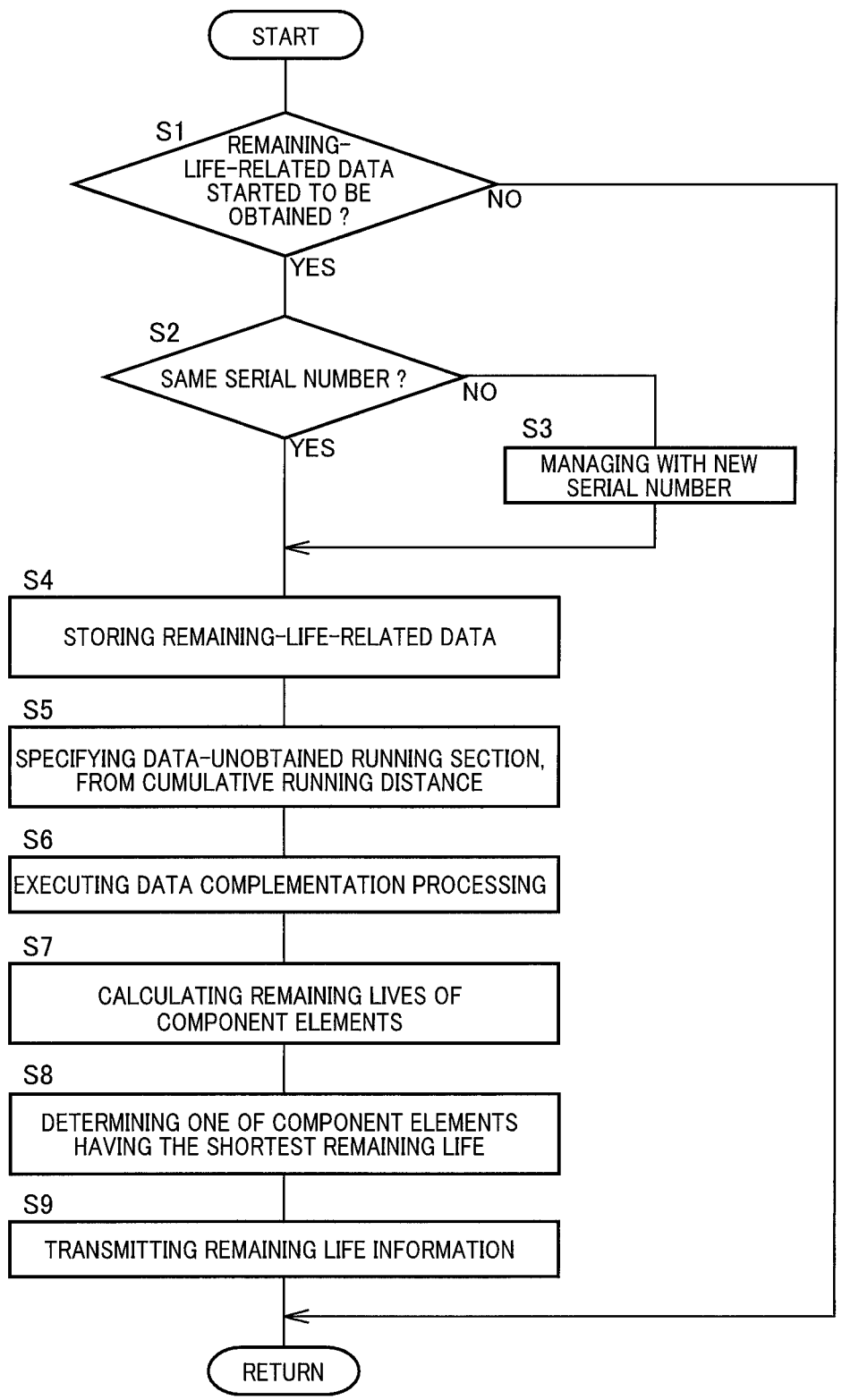
FIG. 6 is a flow chart for specifically explaining a control routine executed by a server shown in FIG. 5.

The control routine shown in FIG. 6 is initiated with step S1 that is implemented to determine whether the remaining-life-related data have started to be obtained, specifically, determine whether transmissions of the remaining-life-related data and the running-related information that relate to the step-variable transmission portion 20 have started with running of the vehicle 20 and the server 142 has received the remaining-life-related data and the running-related information. When the remaining-life-related data and the running-related information have not been received, one cycle of execution of the control routine is completed. When the remaining-life-related data and the running-related information have been received, the control flow goes to step S2 and subsequent steps. Step S2 is implemented to determine the serial number of the received remaining-life-related data is identical with a serial number of the step-variable transmission portion 20 of the vehicle 10, whose information was received in the past. When the serial numbers are identical with each other, the control flow goes to step S4 and subsequent steps. When the serial numbers are different from each other, it can be determined that the step-variable transmission portion 20 has been replaced with a new one, so that the remaining-life-related data need to be obtained as new data. In that case, at step S3 and subsequent steps, the remaining-life-related data are managed as the new data received with the new serial number.

Step S4 is implemented to store the received remaining-life-related data and the running-related information in a data recording medium 160 in real time, namely, store them in the data recording medium 160 concurrently with their receptions. Step S5 is implemented to read out, for example, the cumulative running distance Lc as the running-related information stored in the data recording medium 160, and to determine whether the cumulative running distance Lc has been changed discontinuously, namely, whether the data-unobtained running section has been present. In case of presence of the data-unobtained running section in which the cumulative running distance Lc has been changed discontinuously, it is determined that the discontinuously changed running distance Lcl is the data-unobtained running section, i.e., data-unobtained running distance, and step S6 is implemented to execute a data complementation processing based on the data-unobtained running distance Lcl and step S7 is implemented to execute a remaining-life calculation processing. In case of absence of the data-unobtained running section, the control flow goes to step S7 to execute the remaining-life calculation processing, without implementing step S6. It is also possible to determine whether the cumulative running time Tc has been changed discontinuously, and to determine the discontinuously changed running time Tcl is the data-unobtained running section, i.e., data-unobtained running time, so that the data complementation processing is executed based on the data-unobtained running time Tcl.

At step S6, the data complementation processing is executed to complement a load distribution in each of the component elements of the step-variable transmission portion 20, based on the data-unobtained running distance Lcl, wherein the load distribution is obtained from the remaining-life-related data and represents a relationship between a magnitude (such as a torque and a rotational speed) and a frequency (such as a total number of use, a total number of time and a total number of rotations) of a load applied to each of the component elements. Specifically, a ratio [Lc/(Lc−Lcl)] of the cumulative running distance Lc (that is a total running distance of the vehicle 10) to a data-obtained running distance (Lc−Lcl) (that is obtained by subtracting the data-unobtained running distance Lcl from the cumulative running distance Lc) is obtained, and then complemented data are obtained by multiplying actual data (frequency) by the ratio [Lc/(Lc−Lcl)], as represented by expression (1) given below. The cumulative running distance Lc corresponds to "total running section (of the vehicle)" recited in the appended claims, and the data-unobtained running distance Lcl corresponds to "data-unobtained running section" recited in the appended claims. It is noted that the complementation of the load distribution can be made also by using the cumulative running time Tc as a total running time and the data-unobtained running time Tcl, in accordance with expression (2) given below. The ratios [Lc/(Lc−Lcl)], [Tc/(Tc−Tcl)] in the respective expressions (1), (2) do not necessarily coincide with each other, so that a suitable one of the expressions (1), (2) may be used depending on, for example, a damage factor of the component element whose life is to be estimated.

$$\text{complemented data} = [Lc/(Lc-Lcl)] \times \text{actual data} \quad (1)$$

$$\text{complemented data} = [Tc/(Tc-Tcl)] \times \text{actual data} \quad (2)$$

Figure 7:
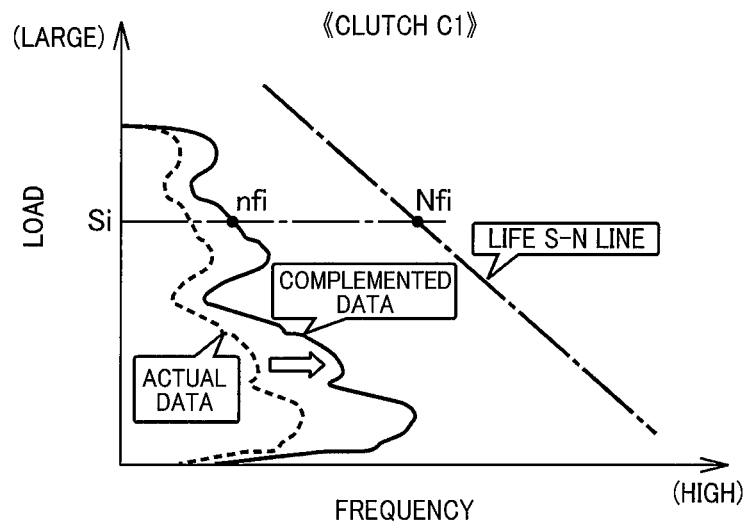
FIG. 7 is an S-N line diagram for explaining a data complementation processing and a remaining-life calculation processing that are made at respective steps S6 and S7 shown in FIG. 6, for a clutch C1 as a component element of au automatic transmission.
Figure 8:
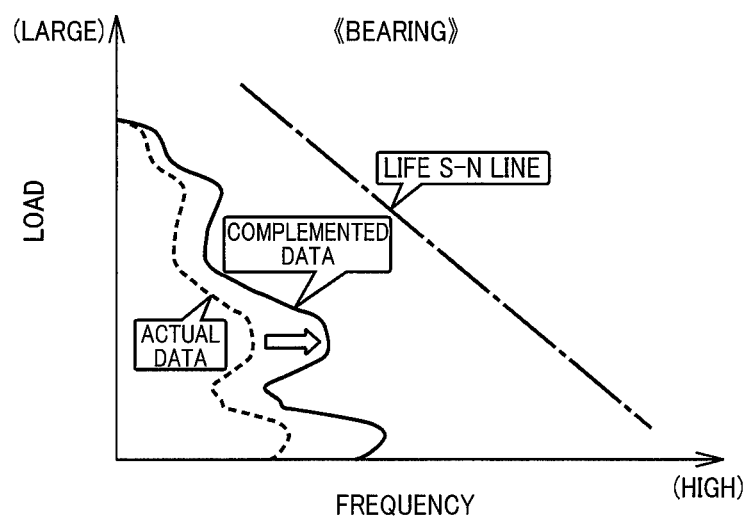
FIG. 8 is an S-N line diagram for explaining the data complementation processing and the remaining-life calculation processing that are made at the respective steps S6 and S7 shown in FIG. 6, for a bearing as a component element of the automatic transmission.
Figure 9:
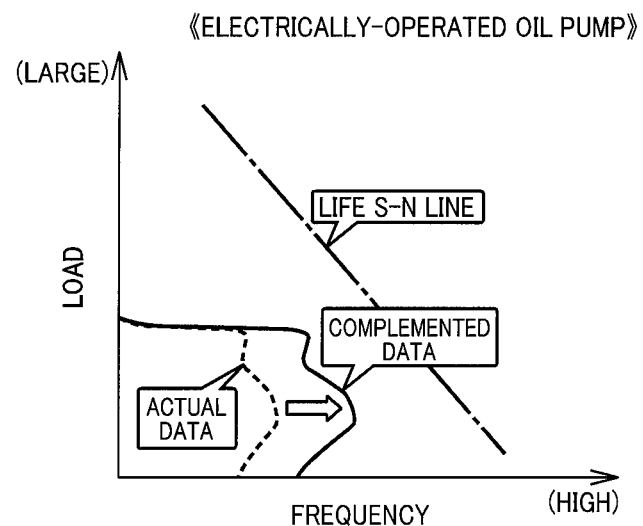
FIG. 9 is an S-N line diagram for explaining the data complementation processing and the remaining-life calculation processing that are made at the respective steps S6 and S7 shown in FIG. 6, for an electrically-operated oil pump as a component element of the automatic transmission.
Figure 10:
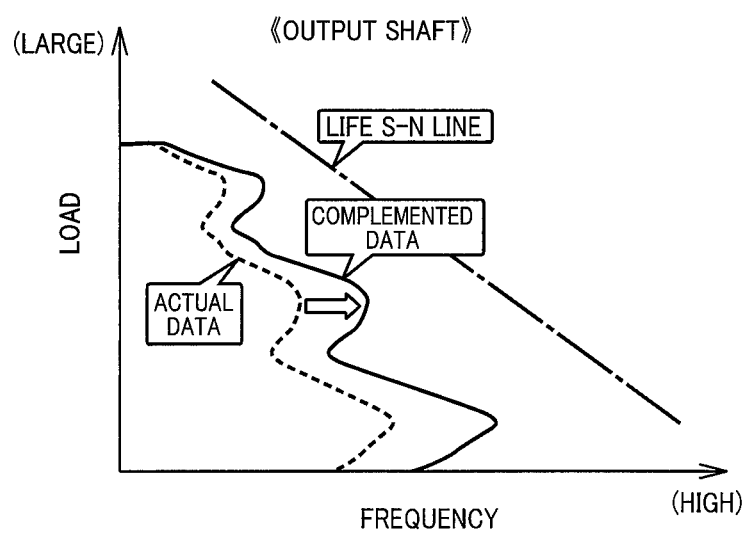
FIG. 10 is an S-N line diagram for explaining the data complementation processing and the remaining-life calculation processing that are made at the respective steps S6 and S7 shown in FIG. 6, for an output shaft as a component element of the automatic transmission.

Each of FIGS. 7-10 is a view for specifically explaining the data complementation processing and the remaining-life calculation processing that are made for a corresponding one of the component elements included in the step-variable transmission portion 20, and showing, by way of example, the load distribution representing the relationship between the magnitude and frequency of the load. In each of FIGS. 7-10, broken line represents the actual date obtained from the remaining-life-related data while solid line represents the complemented data obtained through the data complementation processing made at step S6. FIG. 7 shows the load distribution in the clutch C1, wherein "LOAD" represents a transmission torque while "FREQUENCY" represents an engagement time that is a length of time for which the clutch C1 has been engaged with each level of the transmission torque. FIG. 8 shows the load distribution in the bearing, wherein "LOAD" represents a rotational speed while "FREQUENCY" represents a total number of rotations or a total time of rotations in each level of the rotational speed. FIG. 9 shows the load distribution in the electrically-operated oil pump, wherein "LOAD" represents a rotational torque while "FREQUENCY" represents a total number of rotations or a total time of rotations in each level of the rotational torque. FIG. 10 shows the load distribution in the output shaft 22, wherein "LOAD" represents a transmission torque while "FREQUENCY" represents a total number of rotations or a total time of rotations in each level of the transmission torque. The load applied to each of the engagement devices CB (such as the clutch C1), the output shaft 22, and the gears and bearings of the planetary gear devices 36, 38 is changed depending on an established one of the AT gear positions, namely, reduced to one several-th or increased to several times, even if the input torque inputted to the step-variable transmission portion 20 is not changed, because the drive-force transmitting path is changed depending on the established one of the AT gear positions, namely, the drive force is transmitted through component elements that are changed depending on the established one of the AT gear positions. Thus, the load is calculated by taking account of the established one of the AT gear positions. Further, for example, when the regenerative torque of the second rotating machine MG2 is generated, namely, when the rotational torque is inputted from the drive wheels 28, the load applied to each of the component elements is changed so that the load is calculated by taking account of whether the regenerative torque has been generated by the second rotating machine MG2 or not.

At step S7, the remaining-life calculation processing is executed to calculate the remaining life of each of the component elements of the step-variable transmission portion 20, based on the complemented data obtained for the each of the component elements, because the component elements are different from one another in terms of the durability. Specifically, the complemented data is compared with strength information that is predefined as a load distribution representing a given limit of endurance of the each of the component elements, and a cumulative fatigue-damage degree Dc is calculated, for example, in accordance with Miner's law. Then, the remaining life is estimated based on the calculated cumulative fatigue-damage degree Dc. The strength information is information representing a frequency (fatigue limit or endurance limit) at which the each of the component elements reaches the life end in each region or level of the load. Each of FIGS. 7-10 shows life S-N line represented by one-dot chain line, and the life S-N line is an example of the strength information. As is apparent from FIGS. 7-10, the component elements are different from one another in terms of, for example, an inclination of the life S-N line. The strength information (life S-N line) may be defined by a map or an arithmetic expression which has been obtained through experimentation or simulation and which are stored. Alternatively, the strength information (life S-N line) may be determined based on data (such as big data) of a multiplicity of vehicles each provided with the same step-variable transmission portion 20.

Then, by using a frequency nfi (see FIG. 7) of the complemented data and a frequency Nfi (see FIG. 7) of the life S-N line in each level or region S1 of the load, a fatigue damage degree Dci in each region S1 of the load is calculated by dividing the frequency nfi by the frequency Nfi as represented by expression (3) given below. Further, the cumulative fatigue-damage degree Dc is calculated by integrating the fatigue damage degrees Dci in all regions S1 of the load as represented by expression (4). When the cumulative fatigue-damage degree Dc has become equal to one (cumulative fatigue-damage degree Dc=1), it is regarded that the component element has reached the endurance limit, i.e., the life end of the component element. Therefore, the remaining life is represented by (1−Dc), and a remaining running distance Lrem can be obtained in accordance with expression (5) given below, by using the cumulative running distance Lc that is the total running distance for which the vehicle 10 has run. The remaining running distance Lrem is a remaining distance for which the vehicle 10 can run until the component element reaches the life end, and corresponds to the remaining life of the component element. Further, a remaining running time Trem can be obtained in accordance with expression (6) given below, by using the cumulative running time Tc that is the total running time for which the vehicle 10 has run. The remaining running time Trem is a remaining time for which the vehicle 10 can run until the component element reaches the life end, and corresponds to the remaining life of the component element.

$$Dci = nfi/Nfi \tag{3}$$

$$Dc = \Sigma Dci \tag{4}$$

$$Lrem = [(1-Dc)/Dc] \times Lc \tag{5}$$

$$Trem = [(1-Dc)/Dc] \times Tc \tag{6}$$

Each of the remaining running distance Lrem and the remaining running time Trem may be a certain value. However, in the present embodiment, each of the remaining running distance Lrem and the remaining running time Trem is calculated to a value changed within a certain range, by taking account of an error, for example. For example, the calculated value in each of the expressions (5), (6) may be increased or reduced by a certain rate. Further, each of the remaining running distance Lrem and the remaining running time Trem may be obtained in a manner varying depending on whether an operation state is "STANDARD USE" or "TOUGH USE". That is, in each of the expressions (5), (6), the remaining life is calculated with a condition that the operation state until a current point of time, namely, until the running distance L has reached the cumulative running distance Lc, will be continued. However, by supposing that the operation state until the current point of time has been "STANDARD USE" and that the operation state after the current point of time will be "TOUGH USE", the remaining life may be calculated by reducing the calculated value in each of the expressions (5), (6) by a certain rate. Moreover, another use (e.g., "VERY TOUGH USE") may be added to "STANDARD USE" and "TOUGH USE", so that the remaining life is calculated in a manner varying depending on the operation state corresponds to which one of the three kinds of use.

Figure 11:
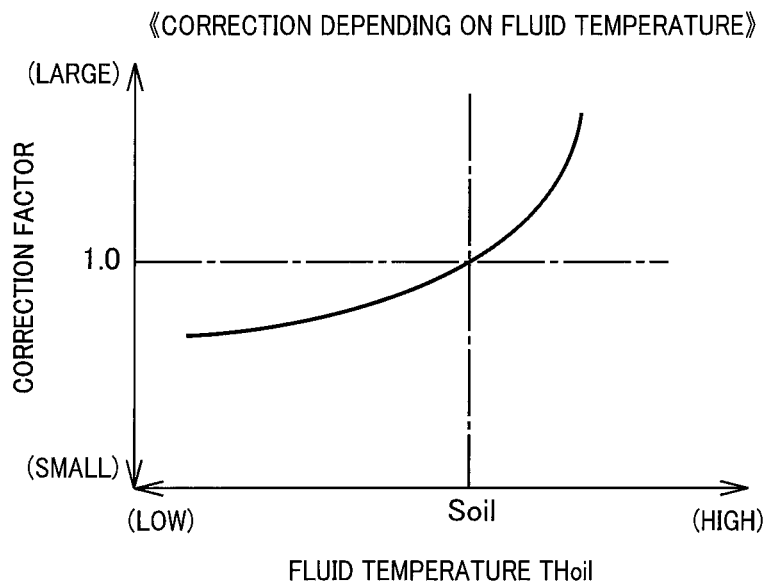
FIG. 11 is a view for explaining a correction factor used when the remaining life is corrected depending on an oil temperature in the remaining-life calculation processing made at step S7 shown in FIG. 6.

Since durabilities of some of the component elements are influenced by the temperature THoil of lubricant fluid, the acceleration dV/dt of the vehicle 10 and/or the resonance, the remaining life may be calculated by taking account of these factors. That is, the actual data and the complemented data of the load distribution, the cumulative fatigue-damage degree Dc and/or the remaining life (the remaining running distance Lrem and/or remaining running time Trem) may be modified or corrected depending on, for example, the fluid temperature THoil, an average acceleration of the vehicle 10 and/or a resonance running distance of the vehicle 10. For example, in general, the lower the fluid temperature THoil, the more advantageous it is for the durability, but the fluid temperature THoil is changed depending on running environment and time. Therefore, regarding the component elements such as the engagement devices CB and the bearings, whose durabilities are influenced by the fluid temperature Thoil, it is preferable to modify or correct the actual data of the load distribution when the actual data are calculated from the remaining-life-related data, for example, by using a predetermined map of a correction factor, as shown in FIG. 11, which is set to 1 when the fluid temperature Soil is a standard temperature value, set to be larger than 1 when the fluid temperature Soil is a higher temperature value, and set to be smaller than 1 when the fluid temperature Soil is a lower temperature value. Since the component elements are influenced by respective degrees that are different from each other, the correction factor may be set to different values for the respective component elements. The standard fluid temperature Soil is a predetermined design temperature, and may be, for example, about 120° C.

Figure 12:
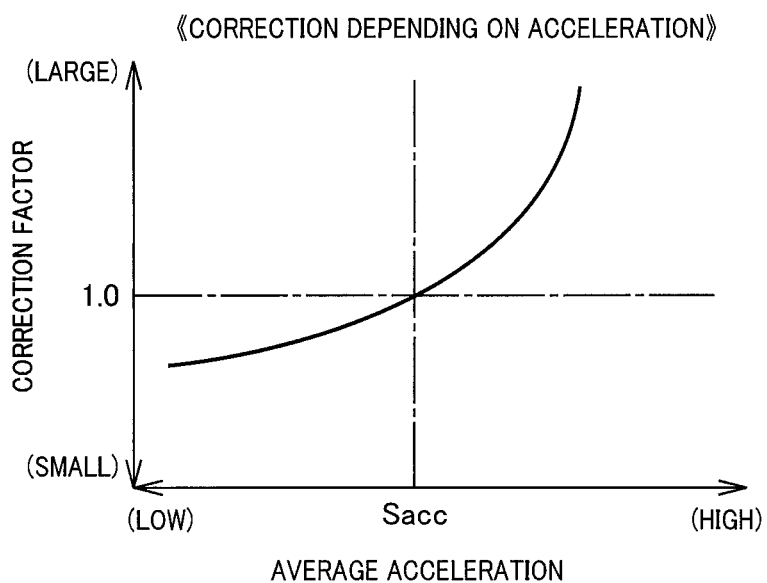
FIG. 12 is a view for explaining a correction factor used when the remaining life is corrected depending on an acceleration in the remaining-life calculation processing made at step S7 shown in FIG. 6.

In general, the higher the acceleration dV/dt of the vehicle 10, the more disadvantageous it is for the durability, but the acceleration dV/dt is changed depending on the running environment and time. Therefore, the modification or correction is made by using an average acceleration. The average acceleration is appropriately, for example, an average of an absolute value of positive and negative accelerations that are generated during respective forward and reverse running of the vehicle 10, but may be an average of only the positive acceleration generated during the forward running. Regarding the component elements such as the engagement devices CB and the output shaft 22, whose durabilities are influenced by the acceleration dV/dt, it is preferable to modify or correct the actual data, the complemented data and/or the cumulative fatigue-damage degree Dc, for example, by using a predetermined map of a correction factor, as shown in FIG. 12, which is set to 1 when the average acceleration is a standard average acceleration Sacc, set to be larger than 1 when the average acceleration is higher than the standard average acceleration Sacc, and set to be smaller than 1 when the average acceleration is lower than the standard average acceleration Sacc. Since the component elements are influenced by respective degrees that are different from each other, the correction factor may be set to different values for the respective component elements. The standard average acceleration Sacc is a predetermined design average acceleration, and may be, for example, about 0.3G. It is noted that the remaining life (the remaining running distance Lrem and/or remaining running time Trem) may be modified or corrected by using a correction factor of reverse characteristic.

Figure 13:
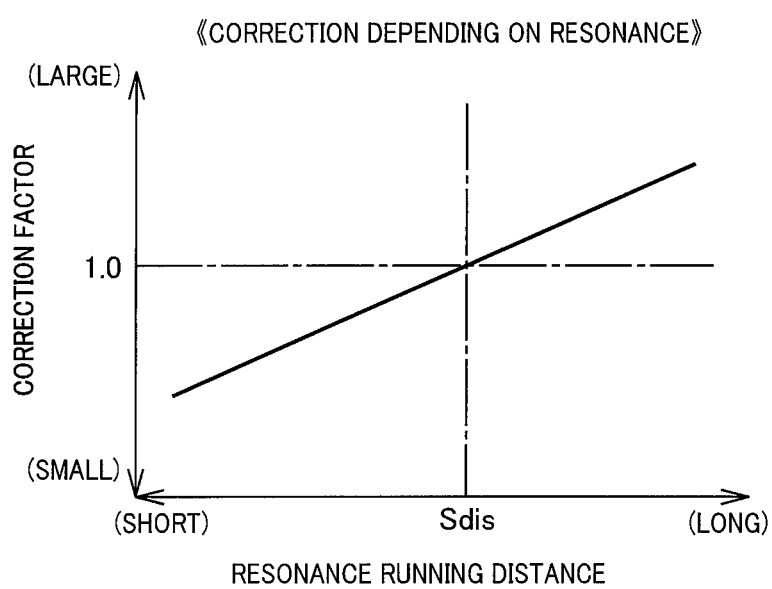
FIG. 13 is a view for explaining a correction factor used when the remaining life is corrected depending on a resonance in the remaining-life calculation processing made at step S7 shown in FIG. 6.

In general, the resonance of the vehicle 10 disadvantageously influences the durability. Therefore, the modification or correction is made by using the resonance running distance that is a distance for which the vehicle 10 has run with the resonance being generated. As the resonance, there are so-called power train resonance and wave-like road resonance. During running of the vehicle 10, generation of the resonance can be detected by a resonance detection sensor, and it can be determined whether the resonance is generated or not, by seeing if there is a periodic fluctuation of torque and rotational speed such as the output rotational speed No. Regarding the component elements such as the engagement devices CB and the output shaft 22, whose durabilities are influenced by the resonance, it is preferable to modify or correct the actual data, the complemented data and/or the cumulative fatigue-damage degree Dc, for example, by using a predetermined map of a correction factor, as shown in FIG. 13, which is set to 1 when the resonance running distance coincides with a standard resonance running distance Sdis, set to be larger than 1 when the resonance running distance is longer than the standard resonance running distance Sdis, and set to be smaller than 1 when the resonance running distance is shorter than the standard resonance running distance Sdis. Since the component elements are influenced by respective degrees that are different from each other, the correction factor may be set to different values for the respective component elements. The standard resonance running distance Sdis is a predetermined design resonance running distance, for example. A resonance running time or the number of resonance running may be used in place of the resonance running distance. It is noted that the remaining life (the remaining running distance Lrem and/or remaining running time Trem) may be modified or corrected by using a correction factor of reverse characteristic.

The durability is disadvantageously influenced when a large torque is inputted from the drive wheels 28, for example, by running on a wave-like road. Therefore, the actual data and/or the complemented data of the load distribution, the cumulative fatigue-damage degree Dc and/or the remaining life (the remaining running distance Lrem and/or remaining running time Trem) may be modified or corrected depending on, for example, the number of times of input of the large torque and a wave-like road running time, such that the actual data, the complemented data and/or the cumulative fatigue-damage degree Dc is increased, and/or such that the remaining life (the remaining running distance Lrem and/or remaining running time Trem) is reduced. Further, when the lubricant fluid is changed, a lubricating performance is restored thereby advantageously influencing the durabilities of the component elements such as the engagement devices CB and the bearings. Therefore, the actual data and/or the complemented data of the load distribution, the cumulative fatigue-damage degree Dc and/or the remaining life (the remaining running distance Lrem and/or remaining running time Trem) may be modified or corrected when it is determined that the lubricant fluid has been changed, based on the maintenance information, such that the actual data, the complemented data and/or the cumulative fatigue-damage degree Dc is reduced, and/or such that the remaining life (the remaining running distance Lrem and/or remaining running time Trem) is increased. The change of the lubricant fluid reduces a viscosity of the lubricant fluid, thereby advantageously influencing the durability of the electrically-operated oil pump, too. However, the durability of the electrically-operated oil pump is advantageously influenced by the change of the lubricant fluid, by a smaller degree than the durabilities of wear parts such as the engagement devices CB and the bearings. Therefore, the component elements may be subjected to respective degrees (rates) of the modification or correction, which are different from each other.

At step S7, the remaining life (remaining running distance Lrem and/or remaining running time Trem) of each of the component elements is calculated. Step S7 is followed by step S8 that is implemented to determine, as the remaining life of the step-variable transmission portion 20, a shortest one of the remaining lives of one of the component elements among the estimated remaining lives of the respective component elements. Then, step S9 is implemented to transmit the information related to the remaining life, i.e., the shortest remaining running distance Lrem and/or shortest remaining running time Trem, to the life management portion 100 of the vehicle 10. In this instance, the information transmitted to the life management portion 100 may include a name of the component element of the shortest remaining running distance Lrem and/or remaining running time Trem. It is noted that, also in the remaining-life management center provided with the server 142 that calculates the remaining life, the remaining life of the step-variable transmission portion 20 and the remaining lives of the respective component elements may be displayed. Further, the remaining life information may be transmitted not only to the vehicle 10 but also to, for example, a terminal of a vehicle dealer who offers services such as inspection of the vehicle 10. The remaining-life management center and the vehicle dealer can provide the remaining life information, for example, when the step-variable transmission portion 20 is replaced by a new one, and can suggest to replace one of the component elements having the shortest remaining life, to a new one, for example, when the vehicle 10 is sold as a used vehicle.

In the vehicle 10 in which the remaining life information has been received from the server 142, the remaining life information is stored in a recording medium by the remaining-life storage portion 104 of the life management portion 100. Further, the remaining-life transmission portion 106, which is configured to read out the remaining life information stored in the recording medium and to transmit the remaining life information to an outside of the vehicle 10, determines whether there has been a command requesting transmission or display of the remaining life information, and causes the display device 89 to display the remaining life (the remaining running distance Lrem and/or remaining running time Trem) when there has been the command. In this instance, the remaining life information may be transmitted through a voice or sound in place of or in addition to the display. Further, the remaining life information may be transmitted irrespective of the command, or may be informed automatically through a lamp lighting, an alarm sound or the like when the remaining life becomes not longer than a threshold. Moreover, a remaining-life display tool, which is provided apart from the vehicle 10, may be connected to the life management portion 100 via a wire or wireless communication, so that the remaining life is displayed in the remaining-life display tool in response to a command requesting display of the remaining life information, which has been transmitted from the remaining-life display tool. The remaining-life display tool may be constituted by, for example, a personal computer, a tablet computer or a dedicated device.

Figure 14:
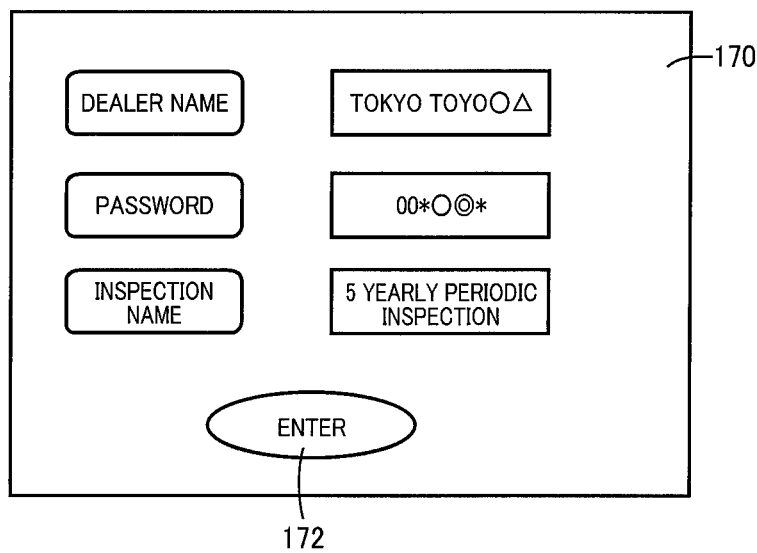
FIG. 14 is a view showing, by way of example, an enter panel that is displayed in a display device of the vehicle when the display device is caused to display the remaining life obtained through execution of the control routine shown in FIG. 6.

FIG. 14 is a view showing, by way of example, an enter panel 170 that is displayed in the display device 89 when the remaining life information is to be displayed. It is determined that a command requesting display of the remaining life information has been issued, when required information such as "DEALER NAME" and "PASSWORD" is entered and an enter button 172 is touched or pressed. The enter panel 170 of FIG. 14 can be selected from, for example, a maintenance panel of the display device 89. On the condition that the entered "DEALER NAME" and "PASSWORD" are corrected, proceeding to the next step is allowed. That is, the remaining life information is to be displayed exclusively for pre-authorized specific workers such as maintenance shop engineers of a vehicle dealer, for example, in a periodic inspection made in the vehicle dealer, so that a third person such as a user of the vehicle is limited from seeing the remaining life information without authorization.

Figure 15:
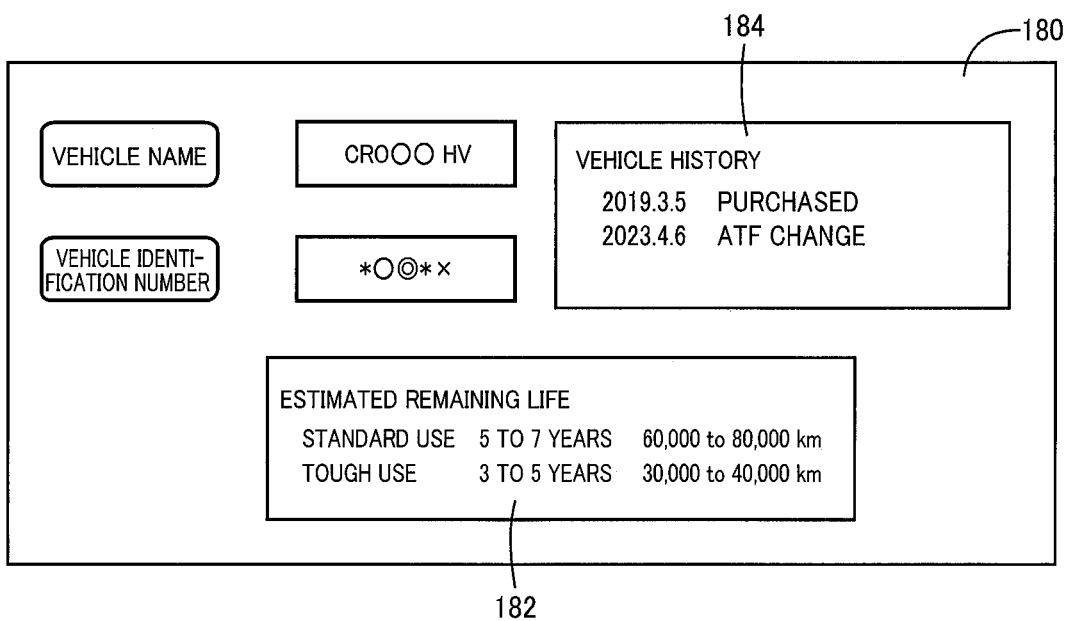
FIG. 15 is a view showing, by way of example, a remaining-life indication panel, which is displayed following the enter panel of FIG. 14.

FIG. 15 is a view showing, by way of example, a remaining-life indication panel 180 that is displayed in the display device 89 when the "DEALER NAME" and "PASSWORD" have been correctly entered and the enter button 172 has been touched or pressed. In the remaining-life indication panel 180, a remaining-life indicating portion 182 and a vehicle-history indicating portion 184 are provided in addition to indications of "VEHICLE NAME" and "VEHICLE IDENTIFICATION NUMBER". The "VEHICLE NAME" and "VEHICLE IDENTIFICATION NUMBER" have been registered in the electronic control apparatus 90, for example, when the vehicle 10 was purchased. A person in charge checks if the "VEHICLE IDENTIFICATION NUMBER" matches with the registered "VEHICLE IDENTIFICATION NUMBER". In the remaining-life indicating portion 182, the estimated remaining life (remaining running time Trem and remaining running distance Lrem) of the step-variable transmission portion 20 is indicated with a certain range in each of case of "STANDARD USE" and case of "TOUGH USE". Therefore, a worker, who saw the remaining-life indicating portion 182, can appropriately determine a time to replace the step-variable transmission portion 20 with a new one. As the estimated remaining life, both of the remaining running time Trem and remaining running distance Lrem do not have to be necessarily indicated as long as at least one of the remaining running time Trem and remaining running distance Lrem is indicated. In the vehicle-history indicating portion 184, the maintenance information such as change of ATF (lubricant fluid) is listed in addition to indication of a purchase date of the vehicle 10.

Referring back to FIG. 1, in the vehicle 10, some or all of the programs and data of the electronic control apparatus 90, which are provided for executing the above-described control operations, are updated by a vehicle-software updating system 110. The vehicle-software updating system 110 includes a pair of gateway ECUs, i.e., first and second gateway ECUs 120, 126 and a software distribution center. The first and second gateway ECUs 120, 126 are provided apart from the electronic control apparatus 90 and are provided in the vehicle 10. The software distribution center is provided outside the vehicle 10. Each of the first and second gateway ECUs 120, 126 is constituted by an electronic control apparatus that includes a so-called microcomputer incorporating a CPU, a ROM, a RAM and an input-output interface.

The first gateway ECU 120 serves as a wireless update portion, and is capable of transmitting and receiving information to and from a server 124 of a software distribution center as an external device, via wireless transceivers 122, 125, so as to download a new update software or softwares, as needed, from the server 124 and update the softwares (programs and data) of the electronic control apparatus 90. The software distribution center is provided by, for example, a manufacturer of the vehicle 10, and is capable of transmitting and receiving information to and from the first gateway ECU 120 through a wireless communication using, for example, a mobile phone network, a wireless LAN network and an internet. The above-described external-network communication antenna 82 also may be used in place of the wireless transceiver 122.

The second gateway ECU 126 serves as a wire update portion, and includes a connector 128 to and from which an update tool 130 is mechanically connectable and disconnectable via a wire or cable. The update tool 130 stores therein available update softwares that have been downloaded, for example, from the server 124 through a wire or wireless communication. In the present embodiment, the update tool 130 is provided in each vehicle dealer who deals the vehicle 10. The update tool 130 is synchronized with the server 124 of the software distribution center at least in terms of the update softwares related to the vehicle 10. The update tool 130 is to be operated by, for example, a maintenance shop engineer, so as to update the softwares (programs and data) of the electronic control apparatus 90.

As described above, in the remaining-life estimation apparatus 140 according to the present embodiment, the remaining-life-related data are transmitted together with the cumulative running distance Lc related to the running of the vehicle 10 are transmitted to the server 142 of the remaining-life management center via the wireless communication; so that the running distance by which the cumulative running distance Lc has been discontinuously changed can be determined as the data-unobtained running distance Lcl for which the remaining-life-related data could not been obtained by the remaining-life management center. It is therefore possible to estimate the remaining life in the form of the remaining running distance Lrem and remaining running time Trem, based on the data-unobtained running distance Lcl, by taking account of reduction of the remaining life of the step-variable transmission portion 20 in the data-unobtained running distance Lcl, thereby improving an accuracy of estimation of the remaining running distance Lrem and remaining running time Trem.

Further, the remaining life is calculated to be reduced by complementing the actual data of the load distribution in accordance with the above-described expression (1), based on the ratio [Lc/(Lc−Lcl)] of the cumulative running distance Lc as the total running section of the vehicle 10, to the data-obtained running distance (Lc−Lcl) as the data-obtained running section of the vehicle 10. It is therefore possible to estimate the remaining life in the form of the remaining running distance Lrem and remaining running time Trem, with a high accuracy in spite of missing of the remaining-life-related data in the data-unobtained running distance Lcl.

Further, the actual data of the load distribution obtained from the remaining-life-related data is complemented based on the data-unobtained running distance Lcl as the data-unobtained running section, and the remaining life in the form of the remaining running distance Lrem and remaining running time Trem is calculated based on the complemented data of the load distribution, whereby the remaining running distance Lrem and remaining running time Trem can be estimated with a high accuracy.

Further, the actual data of the load distribution, which is the relationship between the magnitude and the frequency of the load applied to the step-variable transmission portion 20, are obtained based on the remaining-life-related data, and the cumulative fatigue-damage degree Dc is calculated by comparing the complemented data (to which the actual data has been complemented in accordance with the above-described expression (1)) with the predefined strength information (life S-N line). Then, the remaining life in the form of the remaining running distance Lrem and remaining running time Trem is calculated based on the cumulative fatigue-damage degree Dc in accordance with the above-described expressions (5), (6). Therefore, the remaining running distance Lrem and remaining running time Trem can be estimated with a high accuracy.

Further, the running-related information that includes both of the cumulative running distance Lc and the cumulative running time Tc is transmitted to the remaining-life management center, and the section in which the cumulative running distance Lc and the cumulative running time Tc have been changed discontinuously is determined as the data-unobtained running section (data-unobtained running distance Lcl, data-unobtained running time Tcl), whereby the data-unobtained running section can be easily specified with a high accuracy.

Further, in the present embodiment, the remaining life of the step-variable transmission portion 20 as the drive-force transmitting device, which includes the plurality of component elements having the respective different durabilities, is estimated, such that the remaining lives (remaining running distances Lrem, remaining running times Trem) of the respective component elements are estimated, and the shortest one of the estimated remaining lives of one of the component elements is regarded as the remaining life of the step-variable transmission portion 20. It is therefore possible to appropriately evaluate the remaining life of the step-variable transmission portion 20 including the plurality of component elements having the respective different durabilities.

Further, in the present embodiment, the data-unobtained running-section specifying portion 152 and the remaining-life calculating portion constituted by the data complementing portion 154 and the life calculating portion 156 are provided in the server 142 of the remaining-life management center that is provided outside the vehicle 10, so that the remaining life can be obtained with a higher accuracy by rapidly processing a larger amount of data, as compared with, for example, an arrangement in which the remaining life is calculated by the electronic control apparatus 90 that is provided in the vehicle 10. Further, the information related to the remaining life is transmitted to the vehicle 10 and is then displayed device 89 so that the information related to the remaining life is given to, for example, a maintenance shop engineer. Thus, those who received the information related to the remaining life can easily understand the remaining life of the step-variable transmission portion 20 and appropriately replace the step-variable transmission portion 20 as needed.

While the preferred embodiment of this invention has been described in detail by reference to the drawings, it is to be understood that the embodiment described above are given for illustrative purpose only, and that the present invention may be embodied with various modifications and improvements which may occur to those skilled in the art.

NOMENCLATURE OF ELEMENTS

10: vehicle
20: mechanically-operated step-variable transmission portion (vehicle component, drive-force transmitting device)
22: output shaft (component element of vehicle component)
36, 38: planetary gear devices (component elements of vehicle component)

90: electronic control apparatus
100: life management portion
102: data transmitting portion
106: remaining-life transmission portion
140: remaining-life estimation apparatus
142: server (data management center)
152: data-unobtained running-section specifying portion
154: data complementing portion (remaining-life calculating portion)
156: life calculating portion (remaining-life calculating portion)
158: life-information transmitting portion
C1, C2: clutches (component elements of vehicle component)
B1, B2: brakes (component elements of vehicle component)

What is claimed is:

1. An apparatus for estimating a remaining life of a vehicle component included in a vehicle, based on various kinds of remaining-life-related data that influence the remaining life, the apparatus comprising:
a processor provided in the vehicle, the processor being configured to correlate remaining-life-related data of the various kinds of remaining-life-related data with running of the vehicle and to transmit the remaining-life-related data correlated with the running of the vehicle via a wireless communication;
a server provided at a data management center, the server being configured to:
receive the remaining-life-related data correlated with the running of the vehicle,
specify a data-unobtained running section in which the remaining-life-related data has been unobtainable by the data management center; and
estimate the remaining life, by taking account of a reduction of the remaining life of the vehicle component in the data-unobtained running section.

2. The apparatus according to claim 1,
wherein the server is configured to reduce the remaining life, depending on a ratio of a total running section of the vehicle to a data-obtained running section in which the remaining-life-related data has been obtained by the data management center, the total running section consisting of the data-obtained running section and the data-unobtained running section.

3. The apparatus according to claim 2,
wherein the total running section of the vehicle is one of a total running distance and a total running time of the vehicle, and
wherein the data-obtained running section is one of a running distance and a running time for which the remaining-life-related data has been obtained by the data management center.

4. The apparatus according to claim 1,
wherein the server is configured to complement the remaining-life-related data, based on the data-unobtained running section; and to calculate the remaining life, based on complemented data that are the remaining-life-related data that is complemented.

5. The apparatus according to claim 1,
wherein the server is configured to obtain a load distribution that represents a relationship between a magnitude and a frequency of a load applied to the vehicle component, based on the remaining-life-related data, and to compare the obtained load distribution with strength information that is predefined as a load distribution representing a given limit of endurance of the vehicle component, so as to calculate a cumulative fatigue-damage degree, and
wherein the server is configured to estimate the remaining life, based on the calculated cumulative fatigue-damage degree.

6. The apparatus according to claim 1,
wherein the processor is configured to transmit, to the server, the remaining-life-related data and running-related information that includes at least one of a cumulative running distance and a cumulative running time of the vehicle, and
wherein the server is configured to determine, as the data-unobtained running section, a section in which the at least one of the cumulative running distance and the cumulative running time has been changed discontinuously.

7. The apparatus according to claim 1,
wherein the vehicle component is a drive-force transmitting device including a plurality of component elements having respective durabilities that are different from each other, and
wherein the server is configured to estimate remaining lives of the respective component elements, and to determine, as the remaining life of the drive-force transmitting device, a shortest one of the estimated remaining lives of one of the component elements among the estimated remaining lives of the respective component elements.

8. The apparatus according to claim 1,
wherein the server is configured to transmit information related to the remaining life, to the vehicle, and
wherein the processor is configured to transmit the information related to the remaining life, to an area outside of the vehicle.

* * * * *